US011888236B2

(12) United States Patent
Cho et al.

(10) Patent No.: US 11,888,236 B2
(45) Date of Patent: Jan. 30, 2024

(54) METHOD AND DEVICE FOR SELECTING RECEPTION BEAM ON BASIS OF ARTIFICIAL NEURAL NETWORK

(71) Applicant: Samsung Electronics Co., Ltd., Suwon-si (KR)

(72) Inventors: Yongsang Cho, Suwon-si (KR); Taeyoon Kim, Suwon-si (KR); Chaeman Lim, Suwon-si (KR); Hyoungjoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 415 days.

(21) Appl. No.: 17/295,623

(22) PCT Filed: Sep. 26, 2019

(86) PCT No.: PCT/KR2019/012516
§ 371 (c)(1),
(2) Date: May 20, 2021

(87) PCT Pub. No.: WO2020/111483
PCT Pub. Date: Jun. 4, 2020

(65) Prior Publication Data
US 2022/0029286 A1   Jan. 27, 2022

(30) Foreign Application Priority Data
Nov. 26, 2018   (KR) .................. 10-2018-0147525

(51) Int. Cl.
*H01Q 3/26* (2006.01)
*G06N 3/02* (2006.01)
(Continued)

(52) U.S. Cl.
CPC ............ *H01Q 3/2605* (2013.01); *G06N 3/02* (2013.01); *H01Q 3/24* (2013.01); *H04B 10/695* (2013.01)

(58) Field of Classification Search
CPC .......... G06N 3/02; G06N 3/045; G06N 3/082; H01Q 1/243; H01Q 21/06; H01Q 21/08;
(Continued)

(56) References Cited

U.S. PATENT DOCUMENTS 7,274,951 B2 * 9/2007 Maruta ................ H04B 7/0617
342/368
2006/0014497 A1 * 1/2006 Doi .......................... H01Q 3/24
455/67.11
(Continued)

FOREIGN PATENT DOCUMENTS

JP            6775713 B2    10/2020
KR    10-2017-0004183 A     1/2017
(Continued)

OTHER PUBLICATIONS

Korean Office Action with English translation dated Jul. 3, 2023; Korean Appln. No. 10-2018-0147525 .

*Primary Examiner* — Nguyen T Vo
(74) *Attorney, Agent, or Firm* — Jefferson IP Law, LLP

(57) ABSTRACT

Disclosed in various embodiments of the present invention are a method and a device, the device comprising: an antenna module configured to form a plurality of beams having different directions; and a processor operatively connected to the antenna module, wherein the processor is configured to select a partial reception beam from among a plurality of reception beams, measure the reception power of the selected reception beam, determine a transmission condition through an artificial neural network on the basis of the measured reception power, and determine a reception beam for a communication connection by using the artificial neural network corresponding to the transmission condition. Various embodiments are possible.

15 Claims, 22 Drawing Sheets

(51) Int. Cl.
*H01Q 3/24* (2006.01)
*H04B 10/69* (2013.01)

(58) Field of Classification Search
CPC ........ H01Q 21/28; H01Q 25/002; H01Q 3/24;
H01Q 3/2605; H01Q 3/30; H04B 10/695;
H04B 7/0408; H04B 7/08
See application file for complete search history.

(56) References Cited

U.S. PATENT DOCUMENTS

| | | |
|---|---|---|
| 2013/0223251 A1 | 8/2013 | Li et al. |
| 2017/0288763 A1* | 10/2017 | Yoo .......................... H01Q 3/30 |
| 2017/0302414 A1* | 10/2017 | Islam ................... H04B 7/0421 |
| 2017/0311187 A1 | 10/2017 | Dong et al. |
| 2018/0024220 A1 | 1/2018 | Massarella et al. |
| 2018/0109303 A1 | 4/2018 | Yoo et al. |
| 2018/0262918 A1 | 9/2018 | Zhao et al. |
| 2018/0279286 A1 | 9/2018 | Akoum et al. |
| 2019/0052341 A1 | 2/2019 | Furuskog et al. |
| 2021/0083731 A1 | 3/2021 | Nakamizo et al. |

FOREIGN PATENT DOCUMENTS

| | | |
|---|---|---|
| KR | 10-2018-0080122 A | 7/2018 |
| WO | 2017/084235 A1 | 5/2017 |
| WO | 2018/174769 A1 | 9/2018 |

* cited by examiner

METHOD AND DEVICE FOR SELECTING RECEPTION BEAM ON BASIS OF ARTIFICIAL NEURAL NETWORK

TECHNICAL FIELD

Various embodiments disclose a method and a device for selecting a reception beam, based on an artificial neural network.

BACKGROUND ART 5G communication systems may provide flexible system structures and functions in order to operate various services with different requirements by a single system. 5G communication systems may use mmWave frequency (e.g., 28 to 86 GHz) in order to secure a wide bandwidth. Such frequency characteristics may cause noticeable path loss in a shaded area in the 5G communication system. This is due to the fact that the intensity of a signal is proportional to the square of a wavelength and that the shorter the wavelength, the weaker the diffraction and the more difficult the signal transmits an obstacle. Since the signal must be stably transmitted to all electronic devices located within the coverage of a base station in communication, a beamforming technique may be used to overcome high signal attenuation in the electronic device.

Various beams may be generated by changing the phase of an antenna array, and beamforming may be used for transmission/reception in the electronic device, as well as transmission/reception in the base station, in NR (new radio). The transmission distance may be increased using a sharp beam width for efficient high-frequency transmission, and an optimal transmission/reception beam pair must be found for efficient communication by adjusting both the transmission beam of the base station and the reception beam of the electronic device because the beam width is narrow.

Meanwhile, in the case of beamforming using a directional antenna, the beam width may be reduced while improving the intensity of the transmission/reception signal. For example, the directional antenna is able to transmit a radio wave while focusing the radio wave on a specific location, and is able to receive a signal from a specific location while focusing the same. Since the beam width is narrow, wireless communication performance may vary greatly depending on the location to which the signal is transmitted or the location from which the signal is received. Therefore, in order to improve wireless communication performance, it may be necessary to find an optimal transmission/reception beam pair between the base station and the electronic device.

In order to find a transmission/reception beam pair, the base station is specified to periodically transmit an SS/PBCH block (synchronization sequences/physical broadcast channel block) (SSB) in NR. The electronic device may receive each SSB (synchronization signal block), and may determine a reception beam using the received SSB. In general, the base station may periodically transmit a set of SSBs corresponding to the number of transmission beams capable of being generated. The electronic device may measure the reception intensity (or reception power) using one of the reception beams capable of being generated in response to each SSB set, and may find an optimal reception beam with respect to the transmission beam corresponding to the SSB according thereto.

DISCLOSURE OF INVENTION

Technical Problem

If there is a change in the posture of the electronic device or in the angle between the electronic device and the base station, the optimal transmission/reception beam pair that is previously configured may no longer be effective. The electronic device must perform a process of finding an optimal reception beam. For example, in the case where the number of transmission beams is "NT" and the number of reception beams is "NR", the electronic device may receive "SSB NT" SSB sets corresponding to each transmission beam NR times, thereby finding an optimal transmission/reception beam pair. The transmission period of the SSB set is 5 to 160 ms, and may be generally set to 20 ms. If the transmission period of the SSB set is "TSSB", the reception beam search time may be NR×TSSB. Therefore, although it is optimal to search for signal intensity using all reception beams in the electronic device, it may take a long time, and may cause high consumption of current.

Various embodiments may disclose a method and a device for measuring reception power of a smaller number of reception beams than the total number of reception beams, determining transmission condition information using the measured reception power, and selecting an optimal reception beam by applying the determined result to an artificial neural network.

Solution to Problem

An electronic device according to various embodiments of the disclosure may include: an antenna module configured to form a plurality of reception beams in different directions; and a processor operatively connected to the antenna module, wherein the processor may be configured to select some reception beams from among the plurality of reception beams, measure reception power of the selected reception beams, determine a transmission condition through an artificial neural network, based on the measured reception power, and determine a reception beam for a communication connection using an artificial neural network corresponding to the transmission condition.

An operation method of an electronic device according to various embodiments of the disclosure may include: selecting some reception beams from among a plurality of reception beams in different directions from each other; measuring reception power of the selected reception beams; determining a transmission condition through an artificial neural network, based on the measured reception power; and determining a reception beam for a communication connection using an artificial neural network corresponding to the transmission condition.

Advantageous Effects of Invention

According to various embodiments, it is possible to measure reception power of a smaller number of reception beams than the total number of reception beams, determine transmission condition information using the measured reception power, and select an optimal reception beam by applying the determined result to an artificial neural network.

According to various embodiments, it is possible to reduce the time and current required to search for a reception beam by selecting an optimal reception beam using the reception power of some reception beams among all reception beams using an artificial neural network.

MODE FOR CARRYING OUT THE INVENTION

Figure 1:
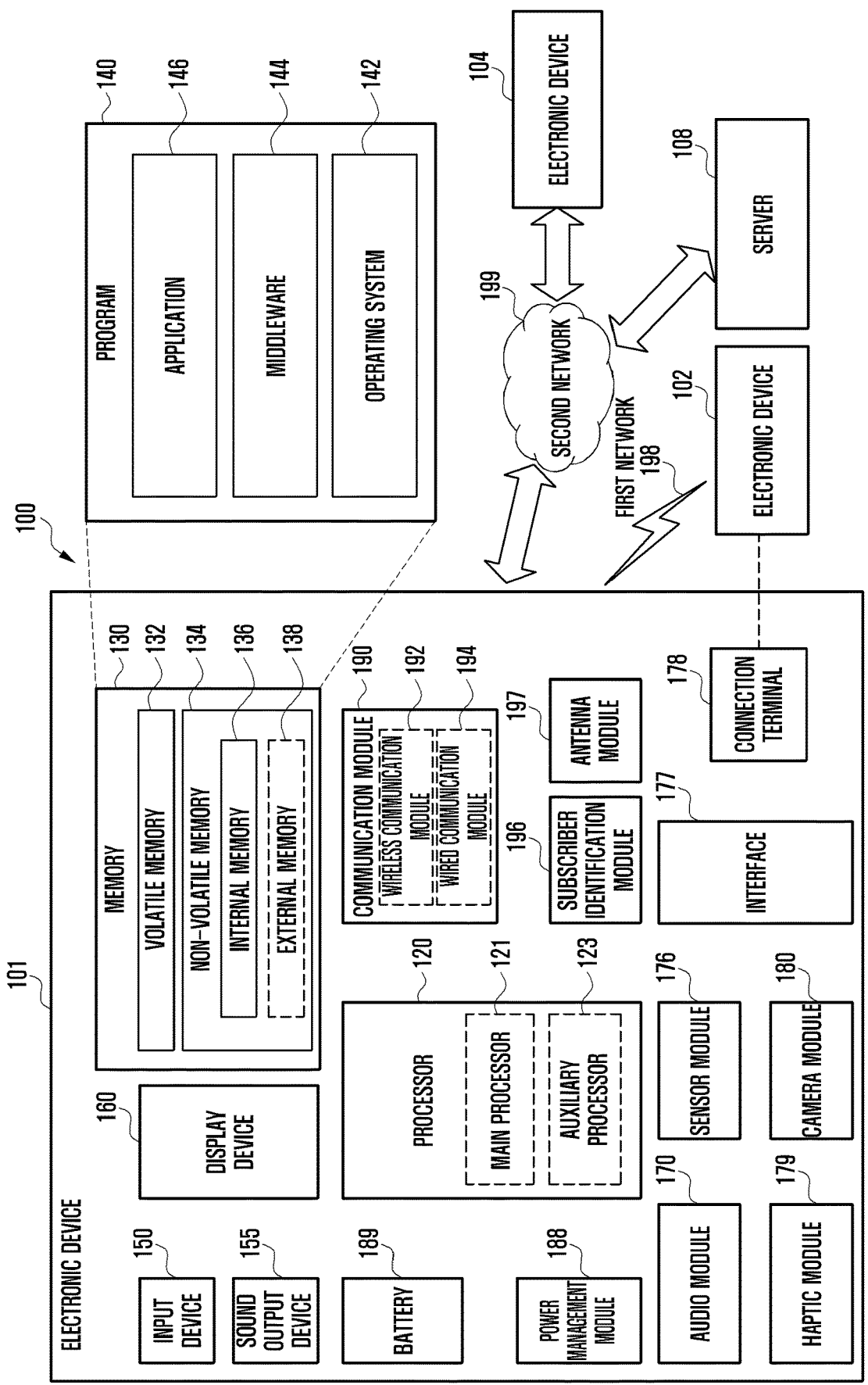
FIG. 1 is a block diagram of an electronic device 101 in a network environment 100 according to various embodiments.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector), The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. The camera module 180 may be one or more modules for acquiring different signals such as RGB, IR, and time of flight (TOF), and may be a combination thereof. For example, the camera module 180 may be in the form of a stereo camera for acquiring two RGB images or may be a stereo camera in which RGB and TOF are combined.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
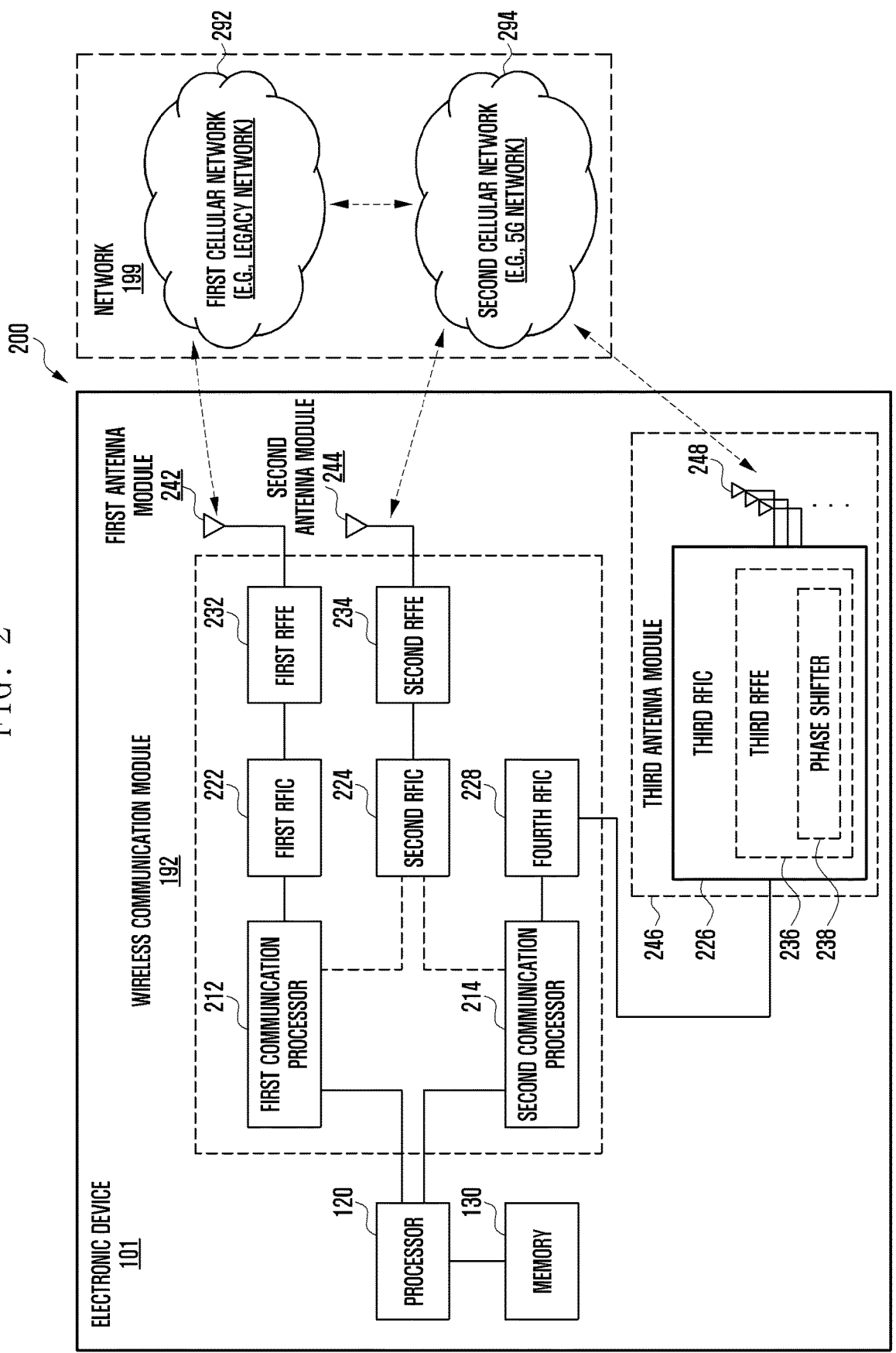
FIG. 2 is a block diagram 200 of an electronic device 101 for supporting legacy network communication and 5G network communication according to various embodiments.

FIG. 2 is a block diagram 200 illustrating an example electronic device 101 for supporting legacy network communication and 5G network communication according to various embodiments.

Referring to FIG. 2, the electronic device 101 may include a first communication processor (e.g., including processing circuitry) 212, a second communication processor (e.g., including processing circuitry) 214, a first radio frequency integrated circuit (RFIC) 222, a second RFIC 224, a third RFIC 226, a fourth RFIC 228, a first radio frequency front end (RFFE) 232, a second RFFE 234, a first antenna module (e.g., including at least one antenna) 242, a second antenna module (e.g., including at least one antenna) 244, and an antenna 248. The electronic device 101 may further include a processor (e.g., including processing circuitry) 120 and a memory 130.

The network 199 may include a first network (e.g., a legacy network) 292 and a second network (e.g., a 5G network) 294. According to another embodiment, the electronic device 101 may further include at least one component among the components illustrated in FIG. 1, and the network 199 may further include at least one different network. According to an embodiment, the first communication processor 212, the second communication processor 214, the first RFIC 222, the second RFIC 224, the fourth RFIC 228, the first RFFE 232, and the second RFFE 234 may form at least a part of the wireless communication module 192. According to another embodiment, the fourth RFIC 228 may be omitted or included as a part of the third RFIC 226.

The first communication processor 212 may include various communication processing circuitry and support establishment of a communication channel in a band to be used for wireless communication with the first network 292, and legacy network communication through the established communication channel. According to various embodiments, the first network may be a legacy network including, for example, and without limitation, a 2G, 3G, 4G, or long term evolution (LTE) network. The second communication processor 214 may support establishment of a communication channel corresponding to a designated band (for example, about 6 GHz to about 60 GHz) among bands to be used for wireless communication with the second network 294, and, for example, and without limitation, 5G network communication through the established communication channel. According to various embodiments, the second network 294 may, for example, be a 5G network as referenced by third generation partnership project (3GPP). Additionally, according to an embodiment, the first communication processor 212 or the second communication processor 214 may support establishment of a communication channel corresponding to another designated band (for example, about 6 GHz or lower) among the bands to be used for wireless communication with the second network 294, and, for example, 5G network communication through the established communication channel. According to an embodiment, the first communication processor 212 and the second communication processor 214 may be implemented inside a single chip or a single package. According to various embodiments, the first communication processor 212 or the second communication processor 214 may, for example, be provided inside a single chip or a single package together with a processor 120, an auxiliary processor 123, or a communication module 190.

The first RFIC 222 may convert a baseband signal generated by the first communication processor 212 into a radio frequency (RF) signal at about 700 MHz to about 3 GHz, which may be used for the first network 292 (for example, legacy network), during transmission. During reception, an RF signal may be acquired from the first network 292 (for example, legacy network) through an antenna (for example, the first antenna module 242), and may be preprocessed through an RFFE (for example, the first RFFE 232). The first RFIC 222 may convert the preprocessed RF signal into a baseband signal such that the same can be processed by the first communication processor 212.

The second RFIC 224 may convert a baseband signal generated by the first communication processor 212 or the second communication processor 214 into an RF signal in a Sub6 band (for example, about 6 GHz or lower) (hereinafter, referred to as a 5G Sub6 RF signal) that may be used for the second network 294 (for example, 5G network). During reception, a 5G Sub6 RF signal may be acquired from the second network 294 (for example, 5G network) through an antenna (for example, the second antenna module 244), and may be preprocessed through an RFFE (for example, the second RFFE 234). The second RFIC 224 may convert the preprocessed 5G Sub6 RF signal into a baseband signal such that the same can be processed by a communication processor corresponding to the first communication processor 212 or the second communication processor 214.

The third RFIC 226 may convert a baseband signal generated by the second communication processor 214 into an RF signal in a 5G Above6 band (for example, about 6 GHz to about 60 GHz) (hereinafter, referred to as a 5G Above6 signal) that is to be used for the second network 294 (for example, 5G network). During reception, a 5G Above6 RF signal may be acquired from the second network 294 (for example, 5G network) through an antenna (for example, the antenna 248), and may be preprocessed through the third RFFE 236. The third RFIC 226 may convert the preprocessed 5G Above6 signal into a baseband signal such that the same can be processed by the second communication processor 214. According to an embodiment, the third RFFE 236 may be formed as a part of the third RFIC 226.

According to an embodiment, the electronic device 101 may include a fourth RFIC 228 separately from the third RFIC 226 or as at least a part thereof. In this example, the fourth RFIC 228 may convert a baseband signal generated by the second communication processor 214 into an RF signal in an intermediate frequency band (for example, about 9 GHz to about 11 GHz) (hereinafter, referred to as an IF signal) and then deliver the IF signal to the third RFIC 226. The third RFIC 226 may convert the IF signal into a 5G Above6 RF signal. During reception, a 5G Above6 RF signal may be received from the second network 294 (for example, 5G network) through an antenna (for example, antenna 248) and converted into an IF signal by the third RFIC 226. The fourth RFIC 228 may convert the IF signal into a baseband signal such that the same can be processed by the second communication processor 214.

According to an embodiment, the first RIFC 222 and the second RFIC 224 may, for example, be implemented as at least a part of a single chip or a single package. According to an embodiment, the first RFFE 232 and the second RFFE 234 may, for example, be implemented as at least a part of a single chip or a single package. According to an embodiment, at least one antenna module of the first antenna module 242 or the second antenna module 244 may be omitted or coupled to another antenna module so as to process RF signal in multiple corresponding bands.

According to an embodiment, the third RFIC 226 and the antenna 248 may be arranged on the same substrate so as to form a third antenna module 246. For example, the wireless communication module 192 or the processor 120 may be arranged on a first substrate (for example, main PCB). In this example, the third RFIC 226 may be formed on a partial area (for example, lower surface) of a second substrate (for example, sub PCB) that is separate from the first substrate, and the antenna 248 may be arranged in another partial area (for example, upper surface), thereby forming a third antenna module 246. The third RFIC 226 and the antenna 248 may be arranged on the same substrate such that the length of the transmission line between the same can be reduced. This may reduce loss (for example, attenuation) of a signal in a high-frequency band (for example, about 6 GHz to about 60 GHz) used for 5G network communication, for example, due to the transmission line. Accordingly, the electronic device 101 may improve the quality or speed of communication with the second network 294 (for example, 5G network).

According to an embodiment, the antenna 248 may, for example, include an antenna array including multiple antenna elements that may be used for beamforming. In this example, the third RFIC 226 may include multiple phase shifters 238 corresponding to the multiple antenna elements, as a part of the third RFFE 236, for example. During transmission, each of the multiple phase shifters 238 may shift the phase of a 5G Above6 RF signal, which is to be transmitted to the outside (for example, base station of 5G network) of the electronic device 101, through a corresponding antenna element. During reception, each of the multiple phase shifters 238 may shift the phase of a 5G Above6 RF signal received from the outside into the same or substantially same phase through a corresponding antenna element. This enables transmission or reception through beamforming between the electronic device 101 and the outside.

The second network 294 (for example, 5G network) may be operated independently of the first network 292 (for example, legacy network) (for example, standalone (SA)), or operated while being connected thereto (for example, non-standalone (NSA)). For example, the 5G network may include an access network (for example, 5G radio access network (RAN) or next-generation network (NG RAN)) and may not include a core network (for example, next-generation core (NGC)). In this example, the electronic device 101 may access the access network of the 5G network and then access an external network (for example, Internet) under the control of the core network (for example, evolved packed core (EPC)) of the legacy network. Protocol information (for example, LTE protocol network) for communication with the legacy network or protocol information (for example, new radio (NR) protocol information) for communication with the 5G network may be stored in the memory 230, and may be accessed by another component (for example, the processor 120, the first communication processor 212, or the second communication processor 214).

Figure 3:
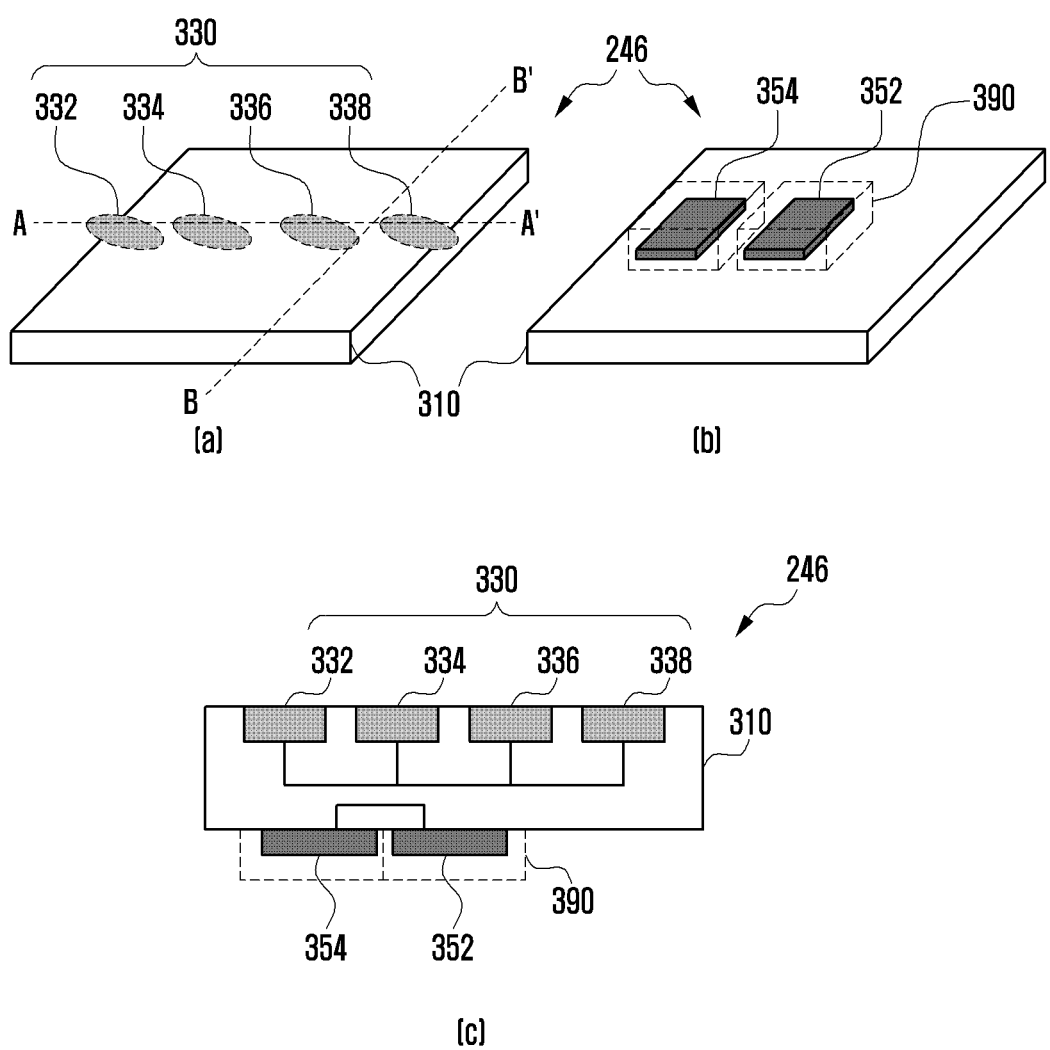
FIG. 3 illustrates an embodiment of the structure of the third antenna module 246 in FIG. 2.

FIG. 3 illustrates an embodiment of a structure of a third antenna module 246 of FIG. 2. For reference, (a) of FIG. 3 is a perspective view of the third antenna module 246 viewed from one side, (b) of FIG. 3 is a perspective view of the third antenna module 246 viewed from another side, and (c) of FIG. 3 is a cross-sectional view of the third antenna module 246, taken along line A-A'.

Referring to FIG. 3, in an embodiment, the third antenna module 246 may include a printed circuit board 310, an antenna array 330, a radio frequency integrated circuit 352 (RFIC), a power management integrated circuit (PMIC) 354, and a module interface 370. Optionally, the third antenna module 246 may further include a shield member 390. In other embodiments, at least one of the above-mentioned components may be omitted or at least two of the components may be integrally formed.

The printed circuit board 310 may include a plurality of conductive layers and a plurality of nonconductive layers alternately laminated on the conductive layers. The printed circuit board 310 may provide electrical connections between various electronic components disposed in the printed circuit board 310 and/or on the outside by using wiring lines and conductive vias disposed on the conductive layers.

The antenna array 330 (e.g., 248 of FIG. 2) may include a plurality of antenna elements 332, 334, 336, or 338 disposed to form a directional beam. The antenna elements, as illustrated, may be disposed on a first surface of the printed circuit board 310. According to another embodiment, the antenna array 330 may be disposed in the interior of the printed circuit board 310. According to various embodiments, the antenna array 330 may include a plurality of antenna arrays (e.g., dipole antenna arrays and/or patch antenna arrays) of the same or different shapes or kinds.

The RFIC 352 (e.g., 226 of FIG. 2) may be disposed on another area (e.g., a second surface that is opposite to the first surface) of the printed circuit board 310, which is spaced apart from the antenna array. The RFIC 352 may be configured to process a signal of a selected frequency band, which is transmitted and received through the antenna array 330. According to an embodiment, the RFIC 352 may convert a baseband signal acquired from a communication processor (not illustrated) to an RF signal of a specific band when the baseband signal is transmitted. The RFIC 352 may convert the RF signal received through the antenna array 352 to a baseband signal and deliver the baseband signal to the communication processor when the RF signal is received.

According to another embodiment, the RFIC 352 may up-convert an IF signal (e.g., about 9 GHz to about 11 GHz) acquired from an intermediate frequency integrated circuit (IFIC) (e.g., 228 of FIG. 2) to an RF signal of a selected band when the IF signal is transmitted. The RFIC 352 may down-convert the RF signal acquired through the antenna array 352 to an IF signal and deliver the IF signal to the IFIC when the RF signal is received.

The PMIC 354 may be disposed in another partial area (e.g., the second surface) of the printed circuit board 310, which is spaced apart from the antenna array. The PMIC may receive a voltage from the main PCB (not illustrated), and may provide electric power that is necessary for various components (e.g., the RFIC 352) on the antenna module.

The shield member 390 may be disposed at a portion (e.g., the second surface) of the printed circuit board 310 to electromagnetically shield at least one of the RFIC 352 or the PMIC 354. According to an embodiment, the shield member 390 may include a shield can.

Although not illustrated, in various embodiments, the third antenna module 246 may be electrically connected to another printed circuit board (e.g., the main circuit board) through a module interface. The module interface may include a connection member, for example, a coaxial cable connector, a board-to-board connector, an interposer, or a flexible printed circuit board (FPCB). Through the connection member, the RFIC 352 and/or the PMIC 354 of the antenna module may be electrically connected to the printed circuit board.

Figure 4:
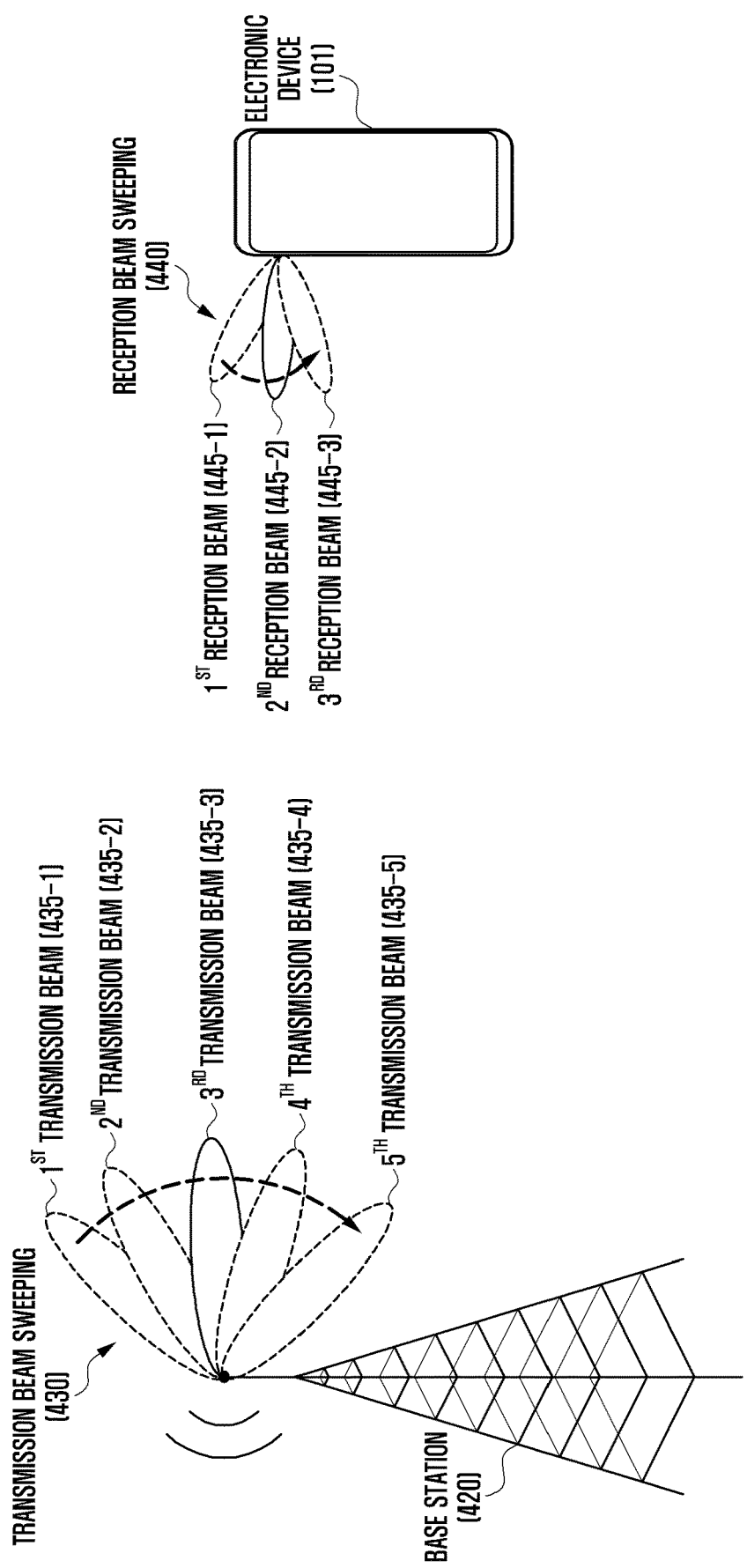
FIG. 4 illustrates an embodiment of an operation for a wireless communication connection between a base station 420 and an electronic device 101, which use directional beams for wireless connection, in the second network 294 (e.g., a 5G network) in FIG. 2.

FIG. 4 illustrates an embodiment of an operation for a wireless communication connection between a base station 420 and an electronic device 101, which use directional beams for wireless connection, in the second network 294 (e.g., a 5G network) in FIG. 2.

Firstly, the base station (gNodeB (gNB) or a transmission reception point (TRP)) 420 may perform a beam detection operation with the electronic device 101 for a wireless communication connection. In the illustrated embodiment, the base station 420 may perform at least one transmission beam sweeping 430 by sequentially transmitting a plurality of transmission beams, for example 1$^{st}$ to 5$^{th}$ transmission beams 431-1 to 431-5 in different directions from each other, for beam detection.

The 1$^{st}$ to 5$^{th}$ transmission beams 431-1 to 431-5 may include at least one SS/PBCH block (synchronization sequences (SS)/physical broadcast channel (PBCH) block). The SS/PBCH Block may be used to periodically measure the channel or the beam intensity of the electronic device 101.

In another embodiment, the 1$^{st}$ to 5$^{th}$ transmission beams 431-1 to 431-5 may include at least one CSI-RS (channel state information-reference signal). The CSI-RS is a standard/reference signal capable of being flexibly configured by the base station 420, and may be transmitted periodically/semi-persistently or aperiodically. The electronic device 101 may measure the channel and the beam intensity using the CSI-RS.

The transmission beams may form a radiation pattern having a selected beam width. For example, the transmission beams may have a broad radiation pattern having a first beam width or a sharp radiation pattern having a second beam width, which is less than the first beam width. For example, the transmission beams including the SS/PBCH block may have a broader radiation pattern than the transmission beams including the CSI-RS.

The electronic device 101 may perform the reception beam sweeping 440 while the base station 420 performs the transmission beam sweeping 430. For example, while the base station 420 performs the first transmission beam sweeping 430, the electronic device 101 may fix a 1$^{st}$ reception beam 445-1 in the first direction to receive a signal of the SS/PBCH block transmitted from at least one of the 1$^{st}$ to 5$^{th}$ transmission beams 431-1 to 431-5. While the base station 420 performs the second transmission beam sweeping 430, the electronic device 101 may fix a 2$^{nd}$ reception beam 445-2 in the second direction to receive a signal of the SS/PBCH block transmitted from the 1$^{st}$ to 5$^{th}$ transmission beams 431-1 to 431-5. As described above, the electronic device 101 may select a reception beam (e.g., the 2$^{nd}$ reception beam 445-2) and a transmission beam (e.g., the 3$^{rd}$ transmission beam 431-3), which are able to communicate with each other, based on a result of the signal reception operation through the reception beam sweeping 440.

After the transmission and reception beams capable of communication are determined as described above, the base station 420 and the electronic device 101 may transmit and/or receive basic information for cell configuration, and may configure information for an additional beam operation, based on the same. For example, the beam operation information may include detailed information on the configured beam, and configuration information on the SS/PBCH block, the CSI-RS or an additional reference signal.

In addition, the electronic device 101 may continuously monitor the channel and the intensity of the beam using at least one of the SS/PBCH block and the CSI-RS included in the transmission beam. The electronic device 101 may adaptively select a beam of good quality through the monitoring operation. Selectively, when the communication connection is released due to movement of the electronic device 101 or blocking of the beam, the electronic device may determine beams capable of communication by reperforming the above beam sweeping operation.

Figure 5:
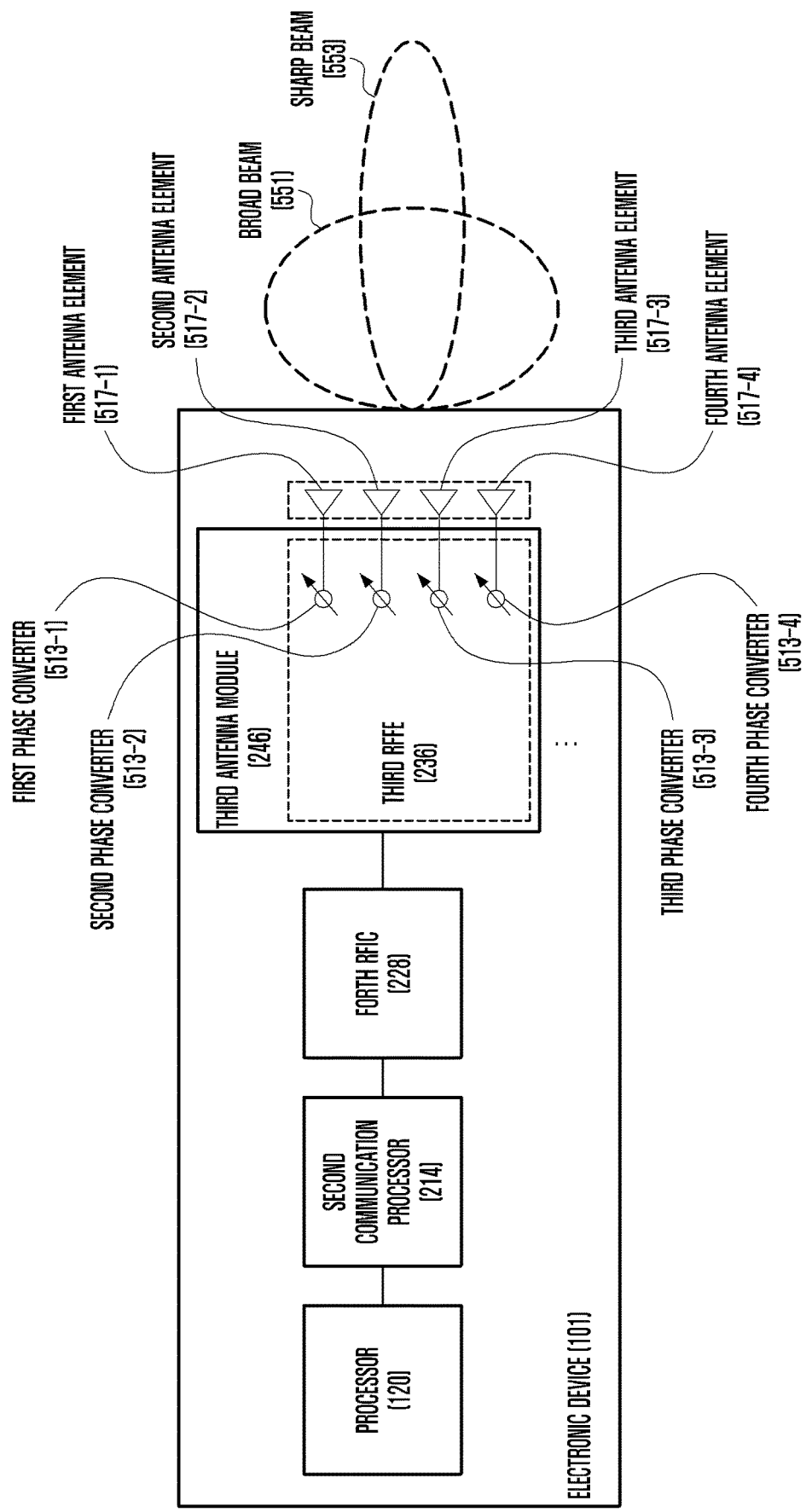
FIG. 5 is a block diagram of an electronic device 101 for 5G network communication according to an embodiment.

FIG. 5 is a block diagram of an electronic device 101 for 5G network communication according to an embodiment. Although the electronic device 101 may include various components shown in FIG. 2, in FIG. 5, for a brief description, the electronic device is illustrated to include a processor 120, a second communication processor 214, a fourth RFIC 228, and at least one third antenna module 246.

In the illustrated embodiment, the third antenna module 246 may include first to fourth phase converters 513-1 to 513-4 (e.g., the phase converter 238 in FIG. 2) and/or first to fourth antenna elements 517-1 to 517-4 (e.g., the antenna 248 in FIG. 2). Each one of the first to fourth antenna elements 517-1 to 517-4 may be electrically connected to each one of the first to fourth phase converters 513-1 to 513-4. The first to fourth antenna elements 517-1 to 517-4 may form at least one antenna array 515.

The second communication processor 214 may control the phases of signals transmitted and/or received through the first to fourth antenna elements 517-1 to 517-4 by controlling the first to fourth phase converters 513-1 to 513-4, thereby generating the transmission beam and/or the reception beam in a selected direction.

According to an embodiment, the third antenna module 246 may form a beam 551 of a broad radiation pattern (hereinafter referred to as a "broad beam") or a beam 553 of a sharp radiation pattern (hereinafter referred to as a "sharp beam"), which are described above, depending on the number of the antenna elements used. For example, the third antenna module 246 may use all of the first to fourth antenna elements 517-1 to 517-4 to form the sharp beam 552, and may use only the first antenna element 517-1 and the second antenna element 517-2 to form the broad beam 551. The broad beam 551 has broader coverage than the sharp beam 552, but has a lower antenna gain, and thus may be more effective for beam searching. On the other hand, the sharp beam 552 has smaller coverage than the broad beam 551, but has a higher antenna gain, thereby enhancing the communication performance.

According to an embodiment, the second communication processor 214 may utilize the sensor module 176 (e.g., a 9-axis sensor, a grip sensor, or a GPS) for beam searching. For example, the electronic device 101 may adjust the beam search location and/or the beam search period, based on the location and/or the movement of the electronic device 101 using the sensor module 176. As another example, when the electronic device 101 is gripped by the user, the electronic device 101 may select an antenna module with better communication performance from among a plurality of the third antenna modules 246 by sensing a portion gripped by the user using the grip sensor.

Figure 6A:
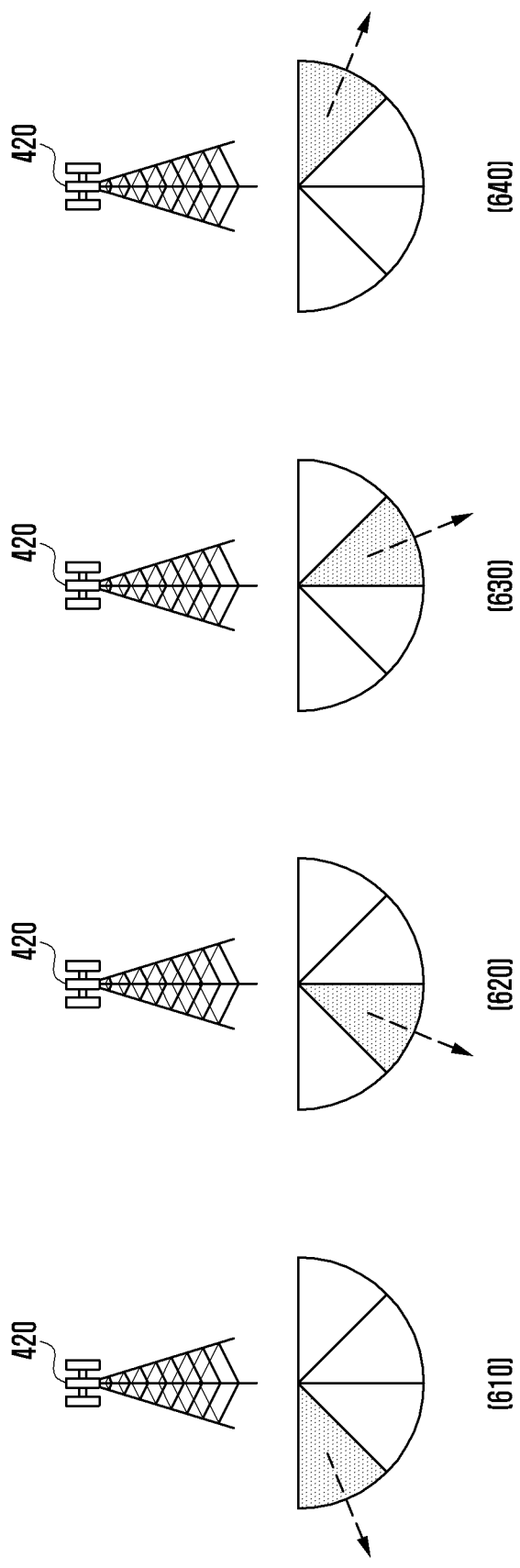
FIGS. 6A and 6B illustrate an embodiment of an operation of finding a pair of transmission/reception beams according to various embodiments.
Figure 6B:
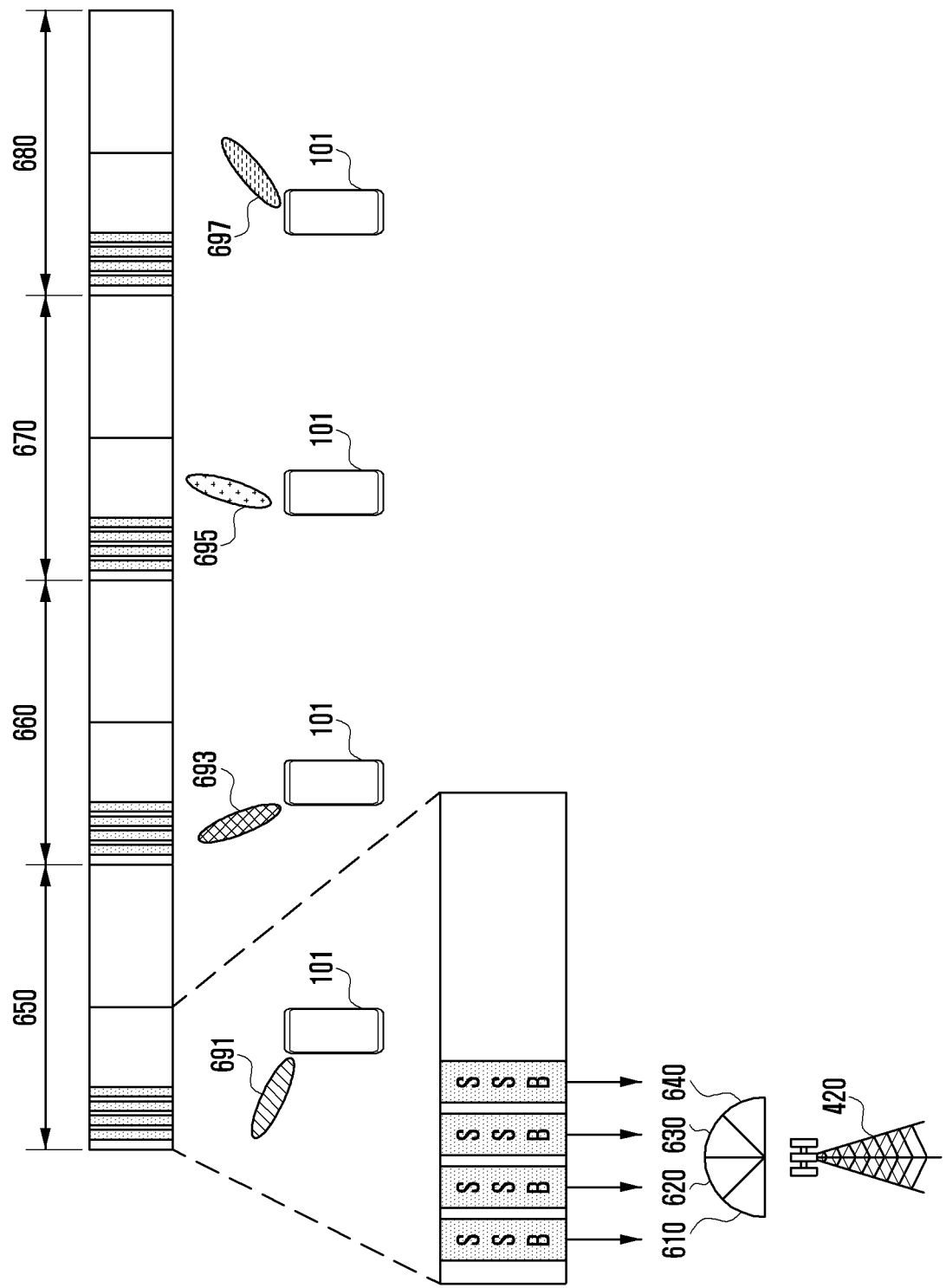

FIGS. 6A and 6B illustrate an embodiment of an operation of finding a pair of transmission/reception beams according to various embodiments.

FIG. 6A illustrates an embodiment of an operation in which a base station 420 transmits transmission beams.

Referring to FIG. 6A, the base station 420 according to various embodiments may sequentially transmit four transmission beams 610 to 640 in different directions (or angles) from each other (e.g., transmission beam sweeping). The base station 420 may include an SS/PBCH block (synchronization sequences/physical broadcast channel block) or a CSI-RS (channel state information-reference signal) corresponding to each of the transmission beams therein. The SS/PBCH block may be referred to as a "synchronization signal block (SSB)". The CSI-RS may be a standard/reference signal capable of being flexibly configured by the base station 420, and may be transmitted periodically/semi-periodically or aperiodically. The base station 420 may periodically transmit one SSB set using the four transmission beams 610 to 640. For example, the base station 420 may periodically transmit one SSB set including SSBs corresponding to the 1st transmission beam 610, the 2$^{nd}$ transmission beam 620, the 3$^{rd}$ transmission beam 630, and the 4$^{th}$ transmission beam 640, respectively.

FIG. 6B illustrates an embodiment of an operation in which the electronic device 101 transmits reception beams.

Referring to FIG. 6B, an electronic device (e.g., the electronic device 101 in FIG. 1) according to various embodiments may generate a plurality of reception beams in different directions (or angles). Although four reception beams are illustrated and described by way of example in the drawing, fewer or more reception beams may be provided. In the case where the electronic device 101 generates four reception beams, the electronic device 101 may receive a SSB set including SSBs, which correspond to the 1$^{st}$ transmission beam 610 to the 4$^{th}$ transmission beam 640, conforming to the number of reception beams (e.g., 4 times) in order to find an optimal transmission/reception beam pair. The electronic device 101 may receive an SSB set using the 1$^{st}$ reception beam 691 during a first transmission period 650, may receive an SSB set using the 2$^{nd}$ reception beam 693 during a second transmission period 660, may receive an SSB set using the 3$^{rd}$ reception beam 695 during a third transmission period 670, and may receive an SSB set using the 4$^{th}$ reception beam 697 during a fourth transmission period 680.

According to various embodiments, situations in which the transmission beam of the base station 420 selected by the electronic device 101 changes may not happen frequently unless the electronic device 101 moves at high speed or unless an obstacle appears suddenly. Therefore, the electronic device 101 may frequently reperform searching for the reception beams. The disclosure makes it possible to find an optimal transmission/reception beam pair (or beam pair), on the assumption that the transmission beam remains, by receiving an SSB set only for some reception beams among the 1$^{st}$ reception beam 691 to the 4$^{th}$ reception beam 697 using artificial neural networks.

Figure 7:
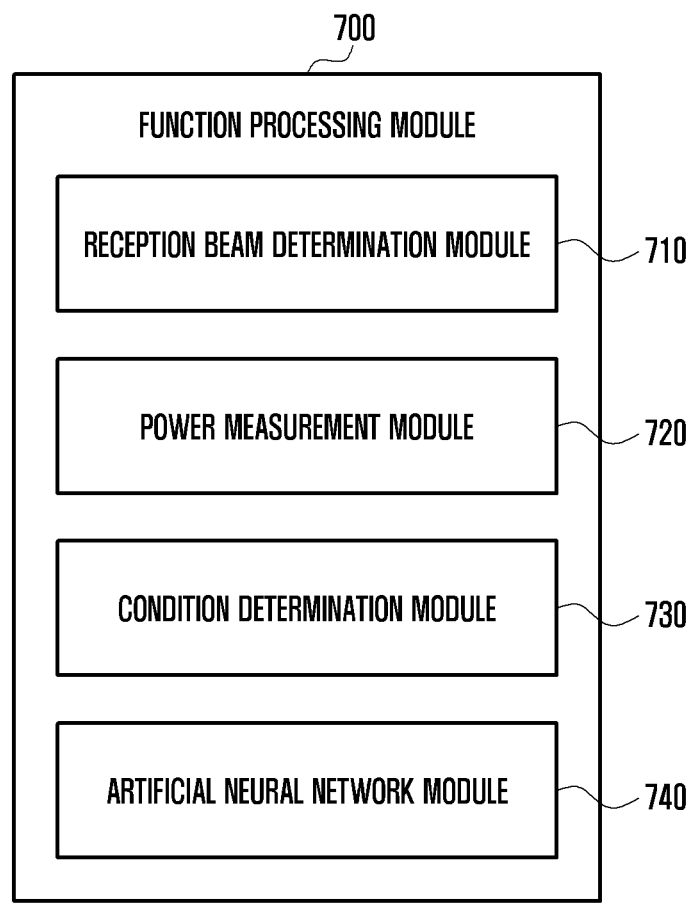
FIG. 7 is a diagram illustrating an example of a function processing module of an electronic device according to various embodiments.

FIG. 7 is a diagram illustrating an example of a function processing module of an electronic device according to various embodiments.

Referring to FIG. 7, a function processing module 700 may be included, as a hardware module, in the processor (e.g., the processor 120 in FIG. 1) including a processing circuit, or may be included as a software module (e.g., the program 140 in FIG. 1). The function processing module 700 may include a reception beam determination module 710, a power measurement module 720, a condition determination module 730, and an artificial neural network module 740. The function processing module 700 shown in FIG. 7 is only an example, and the disclosure is not limited thereto. The function processing module 700 may include fewer modules than those shown in FIG. 7, or may further include other modules in addition to those shown in FIG. 7. For example, the artificial neural network module 740 may be included in an electronic device (electronic device 101 in FIG. 1), or may be included in a server (e.g., the server 108 in FIG. 1). The processor 120 may use the artificial neural network module through the server 108 as necessary. According to various embodiments, the electronic device 101 may download the artificial neural network module 740 from the server 108, and may use the same. For example, the server 108 may store learned artificial neural network coefficients, and may transmit the artificial neural network module 740 to the electronic device 101 capable of utilizing the coefficients.

According to various embodiments, the reception beam determination module 710 may select some reception beams from among a plurality of reception beams (e.g., all reception beams) in different directions from each other. In order to reduce the time and power consumption for searching for reception beams, the reception beam determination module 710 may select some (e.g., NS) reception beams, instead of all (e.g., NR) reception beams, to measure reception power thereof. For example, the reception beam determination module 710 may select a smaller number (e.g., NS) of reception beams than the total number (e.g., NR) of reception beams (e.g., NS≤NR). If reception power of the reception beams is measured, adjacent reception beams may have higher correlation therebetween, and the reception beams far from each other may have lower correlation therebetween. In consideration of this, the reception beam determination module 710 may select at least two reception beams that are not adjacent to each other.

For example, referring to FIG. 6B, all reception beams may include the 1$^{st}$ reception beam 691, the 2$^{nd}$ reception beam 693, the 3$^{rd}$ reception beam 695, and the 4$^{th}$ reception beam 697. The 1$^{st}$ reception beam 691 may be adjacent to the 2$^{nd}$ reception beam 693, the 2$^{nd}$ reception beam 693 may be adjacent to the 3$^{rd}$ reception beam 695, and the 3$^{rd}$ reception beam 695 may be adjacent to the 4$^{th}$ reception beam 697. In this case, the reception beam determination module 710 may select the 2$^{nd}$ reception beam 693 and the 4$^{th}$ reception beam 697, or may select the 1$^{st}$ reception beam 691 and the 4$^{th}$ reception beam 697. The reception beam determination module 710 may transmit the selected reception beams (e.g., the 2$^{nd}$ reception beam 693 and the 4$^{th}$ reception beam 697) to the power measurement module 720.

The reception beam determination module 710 may predict (or select) an optimal reception beam using the artificial neural network module 740. For example, the reception beam determination module 710 may select some reception beams from all of the reception beams, and may then receive a predicted reception beam from the artificial neural network module 740. According to various embodiments, the reception beam determination module 710 may predict success or failure of transmission/reception (e.g., communication failure or an error rate) of the predicted reception beam (e.g., the 3$^{rd}$ reception beam 695), and may determine a reception beam to be used for communication, based on the predicted success or failure of transmission/reception. For example, the reception beam determination module 710 may predict an error rate (e.g., a downlink BLER (block error rate)) of the predicted reception beam, and if the predicted error rate is less than a threshold, may determine the predicted reception beam to be the reception beam to be used for communication. The reception beam determination module 710 may determine the reception beam to be used for communication, based on reception power (e.g., RSRP (reference signal received power)) or a predicted error rate of the predicted reception beam. For example, if the reception power of the predicted reception beam is greater than or equal to a reference value, and if the predicted error rate of the predicted reception beam is less than a threshold, the reception beam determination module 710 may determine the predicted reception beam to be the reception beam to be used for communication.

According to various embodiments, if the reception power of the predicted reception beam is less than a reference value, the reception beam determination module 710 may determine the reception beam, based on a predicted error rate of the reception beam having the highest reception power (e.g., the reception beam of the highest reception power) among the selected reception beams (or the reception beams whose reception power was measured). If the predicted error rate of the reception beam having the highest reception power is less than a threshold, the reception beam determination module 710 may determine the reception beam having the highest reception power to be the reception beam to be used for communication.

According to various embodiments, if the predicted error rate of the predicted reception beam is greater than or equal to the threshold, the reception beam determination module 710 may perform a reception beam reselection process. The reception beam reselection process may indicate selecting unselected reception beams, excluding the reception beams previously (e.g., primarily) selected for prediction of the reception beam. The reception beam determination module 710 may transmit some or all of the unselected reception beams to the power measurement module 720. Alternatively, if the reception power of the predicted reception beam is less than the reference value, and if the predicted error rate of the predicted reception beam is greater than or equal to the threshold, the reception beam determination module 710 may perform the reception beam reselection process. If the predicted error rate of the reception beam having the highest reception power is greater than or equal to the threshold, the reception beam determination module 710 may perform the reception beam reselection process. For example, if the communication state of the predicted reception beam or the reception beam having the highest reception power does not conform to predetermined conditions, the reception beam determination module 710 may perform the process of predicting and determining the reception beam again from the beginning. Alternatively, when a notification indicating that the transmission condition is "no transmission beam" is received from the artificial neural network module 740, the reception beam determination module 710 may perform the reception beam reselection process.

The power measurement module 720 may measure reception power (or reception intensity) for the selected reception beam. When connecting wireless communication, the electronic device 101 may measure signal intensity or signal quality, and may perform a communication connection only if the signal intensity or signal quality is greater than or equal to a predetermined standard. In order to find an optimal reception beam, the base station 420 may periodically transmit an SSB set including SSBs corresponding to the respective transmission beams operated by the base station 420 (e.g., transmission beam sweeping). The power measurement module 720 may measure the reception power using the SSB set received using the selected reception beam. For example, the power measurement module 720 may fix the $1^{st}$ reception beam (e.g., the $1^{st}$ reception beam 691 in FIG. 6B) in the first direction during the transmission beam sweeping (e.g., while receiving the SSB set), and may receive an SS/PBCH block signal transmitted from at least one of the $1^{st}$ to $4^{th}$ transmission beams (e.g., 610 to 640). The power measurement module 720 may measure the reception power (e.g., RSRP (reference signal received power)) of the $1^{st}$ reception beam 691 using the SS/PBCH block signal.

According to various embodiments, the transmission beam operated by the base station 420 may include at least one CSI (channel state information) or CSI-RS (channel state information-reference signal). The CSI or the CSI-RS may be a standard/reference signal capable of being flexibly configured by the base station 420, and may be transmitted periodically/semi-periodically or aperiodically. The power measurement module 720 may measure reception power using the CSI-RS. The power measurement module 720 may transmit the reception power of the selected reception beam to the condition determination module 730 or the artificial neural network module 740. The power measurement module 720 may measure reception power of the predicted reception beam. The power measurement module 720 may receive the predicted reception beam from the artificial neural network module 740, and may fix the beam in the direction of the predicted reception beam, thereby measuring the reception power of the predicted reception beam using a received SS/PBCH block signal. The power measurement module 720 may transmit the reception power of the predicted reception beam to the reception beam determination module 710.

The condition determination module 730 may determine a transmission condition, based on the measured reception power. The transmission condition may indicate the situation of the transmission beam for the selected reception beam. For example, the transmission condition may include at least one of no transmission beam (e.g., NULL), NLOS (non-line of sight), or LOS (line of sight). For example, if the reception power of the selected reception beam is less than or equal to the minimum power (e.g., −120 dBm), the condition determination module 730 may determine the transmission condition to be "no transmission beam". For example, if the reception power measured in two reception beams among four reception beams is less than or equal to the minimum power, the condition determination module 730 may determine the transmission condition to be "no transmission beam".

According to various embodiments, if the reception power of the selected reception beam exceeds the minimum power, the condition determination module 730 may determine the transmission condition to be "NLOS" or "LOS". For example, if the reception power measured in two reception beams among four reception beams exceeds the minimum power, the condition determination module 730 may determine the transmission condition to be "NLOS" or "LOS". Specifically, if the difference in the reception power between the selected reception beams is small, the condition determination module 730 may determine the transmission condition to be "NLOS". For example, "NLOS" may indicate the case in which the reception power measured in most of the reception beams is evenly high, and may indicate the case in which the difference in the reception power between the selected reception beams is less than or equal to a reference value (e.g., 5 dBm or 10 dBm). If the difference in the reception power between the selected reception beams is large, the condition determination module 730 may determine the transmission condition to be "LOS". For example, "LOS" may indicate the case where the maximum reception power is observed in a specific reception beam and where the reception power is reduced as it goes away from the reception beam having the maximum reception power, and may indicate the case in which the difference in the reception power between the selected reception beams exceeds a reference value.

According to various embodiments, the condition determination module 730 may determine the transmission condition using the artificial neural network module 740. For example, the condition determination module 730 may receive a transmission condition from the artificial neural network module 740.

The artificial neural network module 740 may determine the transmission condition, based on the measured reception power. The artificial neural network module 740 may input the measured reception power to an artificial neural network (e.g., the first artificial neural network) for determining the transmission condition, thereby determining the transmission condition. For example, if the measured reception power for the selected reception beam is less than or equal to the minimum power, the artificial neural network module 740 may determine the transmission condition to be "no transmission beam". If the reception power of the selected reception beam exceeds the minimum power, the artificial neural network module 740 may determine the transmission condition to be "NLOS" or "LOS".

According to various embodiments, the artificial neural network module 740 may predict a reception beam to be used for communication, based on the transmission condition. For example, the artificial neural network module 740 may input output values of the first artificial neural network to respective artificial neural network algorithms that are different depending on the transmission condition, thereby predicting the reception beam. If the transmission condition is determined to be "no transmission beam", the artificial neural network module 740 may transmit the transmission condition to the reception beam determination module 710 for reselection of the reception beam. If the transmission condition is determined to be "NLOS", the artificial neural network module 740 may input an output value of the first artificial neural network to the artificial neural network (e.g., the second artificial neural network) corresponding to "NLOS", thereby predicting the reception beam. In addition, if the transmission condition is determined to be "LOS", the artificial neural network module 740 may input an output value of the first artificial neural network to the artificial neural network (e.g., the third artificial neural network) corresponding to "LOS", thereby predicting the reception beam. The artificial neural network module 740 may transmit the predicted reception beam to the reception beam determination module 710. The first artificial neural network to the third artificial neural network may learn different statistical characteristics from each other, and thus may output different values corresponding to the input values. The artificial neural network module 740 may include the first artificial neural network to the third artificial neural network.

An electronic device (e.g., the electronic device 101 in FIG. 1) according to various embodiments of the disclosure may include: an antenna module (e.g., the antenna module 197 in FIG. 1) configured to form a plurality of reception beams in different directions; and a processor (e.g., the processor 120 in FIG. 1) operatively connected to the antenna module, wherein the processor may be configured to select some reception beams from among the plurality of reception beams, measure reception power of the selected reception beams, determine a transmission condition through an artificial neural network, based on the measured reception power, and determine a reception beam for a communication connection using an artificial neural network corresponding to the transmission condition.

The processor may be configured to select at least two reception beams, which are not adjacent to each other, from among the plurality of reception beams.

The processor may be configured to determine the transmission condition by inputting the measured reception power to the artificial neural network for determining the transmission condition.

The transmission condition may include at least one of no transmission beam, NLOS (non-line of sight), or LOS (line of sight), and the processor may be configured to predict a reception beam using an artificial neural network corresponding to the transmission condition.

The processor may be configured, if the transmission condition is "NLOS", to predict a reception beam using an artificial neural network corresponding to "NLOS", and, if the transmission condition is "LOS", to predict a reception beam using an artificial neural network corresponding to "LOS".

The processor may be configured, if the transmission condition is "no transmission beam", to perform a reception beam prediction process for a reception beam that is not selected from among the plurality of reception beams.

The processor may be configured, if reception power of the selected reception beam is less than or equal to a minimum power, to determine the transmission condition to be "no transmission beam", and, if the reception power of the selected reception beam exceeds the minimum power, to determine the transmission condition to be "NLOS" or "LOS".

The processor may be configured, if a difference in reception power between the selected reception beams is less than or equal to a reference value, to determine the transmission condition to be "NLOS", and, if a difference in reception power between the selected reception beams exceeds the reference value, to determine the transmission condition to be "LOS".

The processor may be configured to predict a reception beam using the artificial neural network corresponding to the transmission condition, determine success or failure of communication through the predicted reception beam, and determine a reception beam for a communication connection, based on the determination result.

The processor may be configured to predict an error rate of the predicted reception beam, and, if the predicted error rate is less than a threshold, to determine the predicted reception beam to be a reception beam for a communication connection.

The processor may be configured to predict an error rate of the predicted reception beam, if the predicted error rate is greater than or equal to a threshold, to determine that communication fails, and to perform a reception beam prediction process for a reception beam that is not selected from among the plurality of reception beams.

The processor may be configured to predict a reception beam using an artificial neural network corresponding to the transmission condition, measure reception power of the predicted reception beam, and determine a reception beam for a communication connection, based on the measured reception power.

The processor may be configured, if the reception power of the predicted reception beam is greater than or equal to a reference value, to predict an error rate of the predicted reception beam, and, if the predicted error rate is less than a threshold, to determine the predicted reception beam to be a reception beam for a communication connection.

The processor may be configured, if the reception power of the predicted reception beam is less than a reference value, to predict an error rate of a reception beam having the highest reception power among the reception beams whose reception power was measured, and, if the predicted error rate is less than a threshold, to determine the reception beam having the highest reception power to be a reception beam for a communication connection.

The processor may be configured, if the reception power of the predicted reception beam is greater than or equal to a reference value, to predict an error rate of the predicted reception beam, and, if the predicted error rate is greater than or equal to a threshold, to perform a reception beam prediction process for the reception beams that are not selected from among the plurality of reception beams.

Figure 8:
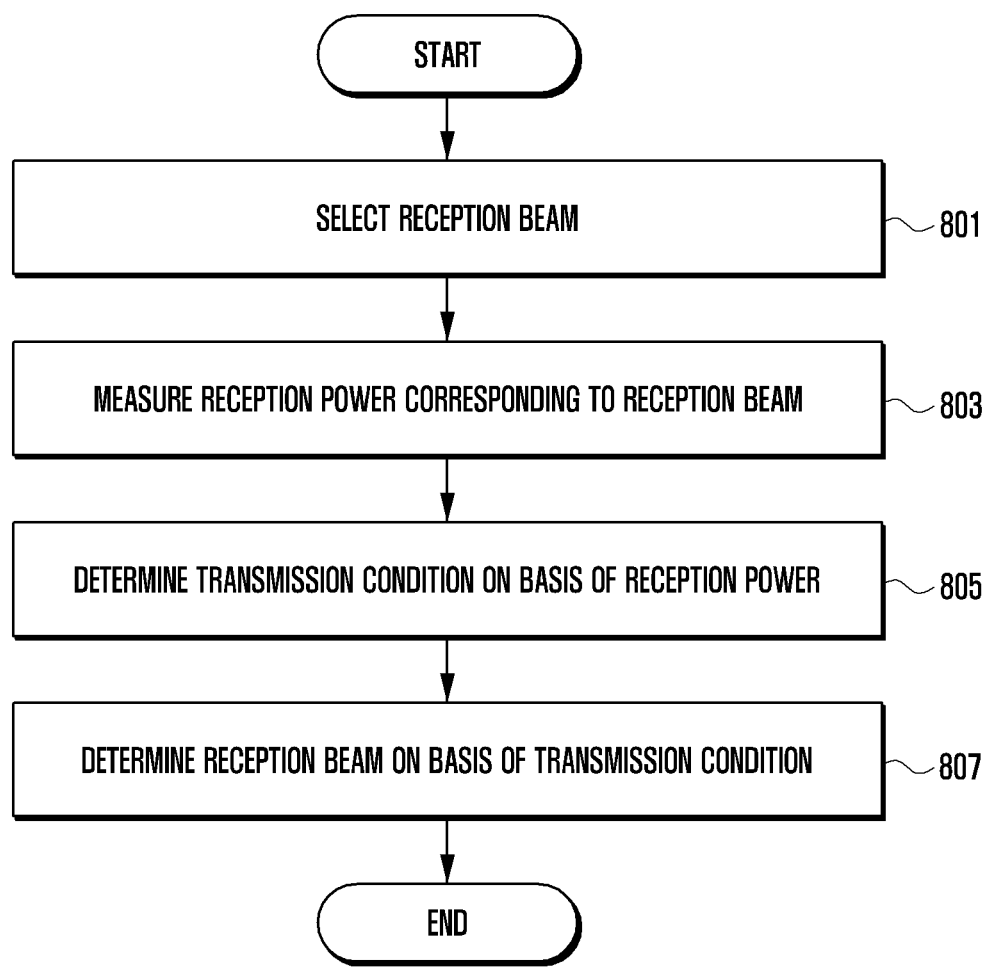
FIG. 8 is a flowchart illustrating an operation method of an electronic device according to various embodiments.

FIG. 8 is a flowchart illustrating an operation method of an electronic device according to various embodiments.

Referring to FIG. 8, in operation 801, a processor (e.g., the processor 120 in FIG. 1) of an electronic device (e.g., the electronic device 101 in FIG. 1) according to various embodiments may select a reception beam. The processor 120 (e.g., the reception beam determination module 710) may select at least two reception beams that are not adjacent to each other from a plurality of reception beams in different directions from each other. For example, referring to FIG. 6B, the processor 120 may select some reception beams (e.g., the $1^{st}$ reception beam 691 and the $4^{th}$ reception beam 697) from among all of the reception beams (e.g., the $1^{st}$ reception beam 691, the $2^{nd}$ reception beam 693, the $3^{rd}$ reception beam 695, and the $4^{th}$ reception beam 697).

According to various embodiments, the processor 120 may use big data or artificial neural networks for selecting the reception beam. The processor 120 may use the big data or the artificial neural network downloaded from a server (e.g., the server 108 in FIG. 1). For example, the server 108 may store learned artificial neural network coefficients, and may transmit the artificial neural network to the electronic device 101 capable of utilizing the coefficients.

According to various embodiments, in operation 803, the processor 120 (e.g., the power measurement module 720) may measure reception power of the selected reception beam. For example, if the selected reception beam is a $1^{st}$ reception beam (e.g., the $2^{nd}$ reception beam 691 in FIG. 6B), the processor 120 may fix the beam in the second direction of the $1^{st}$ reception beam 691, and may measure the reception power of the $1^{st}$ reception beam 691 using an SS/PBCH block signal received from the base station (e.g., the base station 420 in FIG. 4). Alternatively, the processor 120 may measure the reception power of the $1^{st}$ reception beam 691 using the CSI or CSI-RS received from the base station 420. In addition, the processor 120 may measure the reception power of the $4^{th}$ reception beam 697 using the SS/PBCH block signal.

According to various embodiments, in operation 805, the processor 120 (e.g., the condition determination module 730 or the artificial neural network module 740) may determine a transmission condition, based on the measured reception power. The processor 120 may input the measured reception power to the artificial neural network (e.g., the first artificial neural network) for determining the transmission condition. The first artificial neural network may determine the transmission condition using the input reception power. The transmission condition may include at least one of no transmission beam, NLOS, or LOS. For example, the first artificial neural network may determine the transmission condition to be "no transmission beam" if the reception power is less than or equal to the minimum power (e.g., −120 dBm), and may determine the transmission condition to be "NLOS" or "LOS" if the reception power exceeds the minimum power. Specifically, the first artificial neural network may determine the transmission condition to be "NLOS" if the difference in the reception power is less than or equal to a reference value (e.g., 5 dBm or 10 dBm), and may determine the transmission condition to be "LOS" if the difference in the reception power exceeds the reference value (e.g., 5 dBm or 10 dBm).

In operation 807, the processor 120 (e.g., the reception beam determination module 710 or the artificial neural network module 740) may determine the reception beam, based on the transmission condition. For example, the processor 120 may input an output value of the first artificial neural network to the artificial neural network corresponding to the transmission condition. For example, if the transmission condition is "no transmission beam", the processor 120 may return to operation 801 for reselection of the reception beam. Returning to operation 801, the processor 120 may select an unselected reception beam.

If the transmission condition is "NLOS", the processor 120 may input an output value of the first artificial neural network to the artificial neural network (e.g., the second artificial neural network) corresponding to "NLOS". The second artificial neural network may predict an optimal reception beam using the output value of the first artificial neural network. For example, the processor 120 may predict the $2^{nd}$ reception beam 693 as an optimal reception beam using the selected reception beam (e.g., the $1^{st}$ reception beam 691 and the $4^{th}$ reception beam 697). The processor 120 may use the reception beam predicted by the second artificial neural network for communication. If the transmission condition is "LOS", the processor 120 may input an output value of the first artificial neural network to the artificial neural network (e.g., the third artificial neural network) corresponding to "LOS". The $3^{rd}$ artificial neural network may predict an optimal reception beam using the output value of the artificial neural network. The processor 120 may use the reception beam predicted by the $3^{rd}$ artificial neural network for communication.

According to various embodiments, the processor 120 may determine whether or not to use the reception beam predicted by the $2^{nd}$ artificial neural network or the $3^{rd}$ artificial neural network for communication, based on a prediction about success or failure of transmission/reception of the predicted reception beam fails (e.g., communication failure). For example, the processor 120 may predict an error rate of the predicted reception beam, and if the predicted error rate is less than a threshold, may determine the predicted reception beam to be the reception beam to be used for communication. According to various embodiments, the processor 120 may determine the reception beam to be used for communication, based on the reception power or error rate of the predicted reception beam. For example, if the reception power of the predicted reception beam is greater than or equal to a reference value, and if a predicted error rate of the predicted reception beam is less than a threshold, the processor 120 may determine the predicted reception beam to be the reception beam to be used for communication.

Figure 9A:
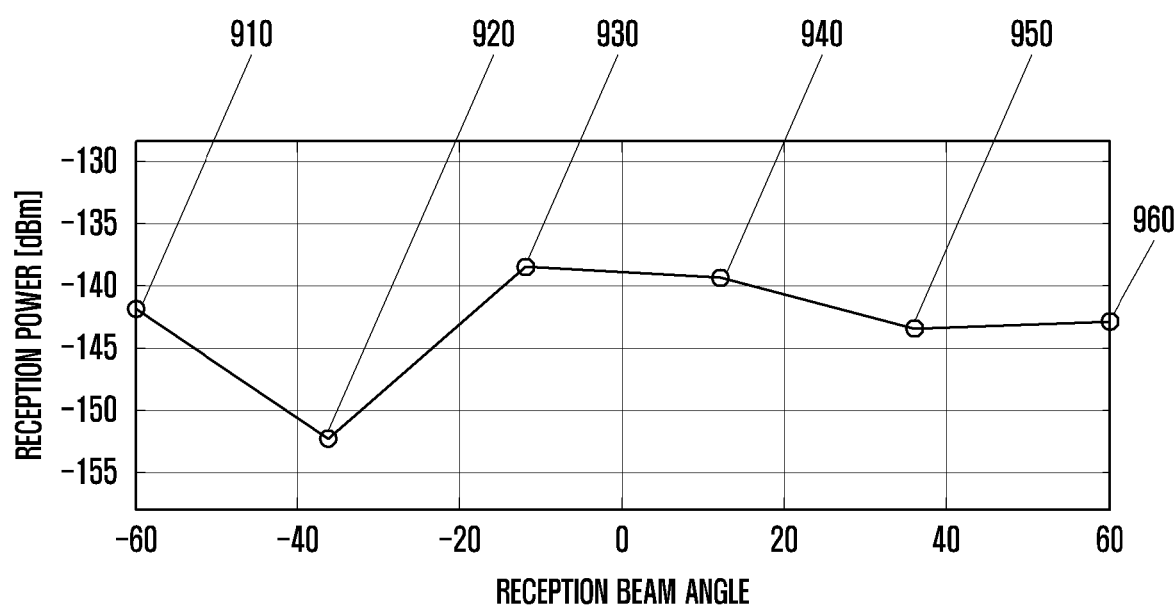
FIGS. 9A to 9C are diagrams illustrating examples of reception power measured according to a transmission condition in an electronic device according to various embodiments.
Figure 9B:
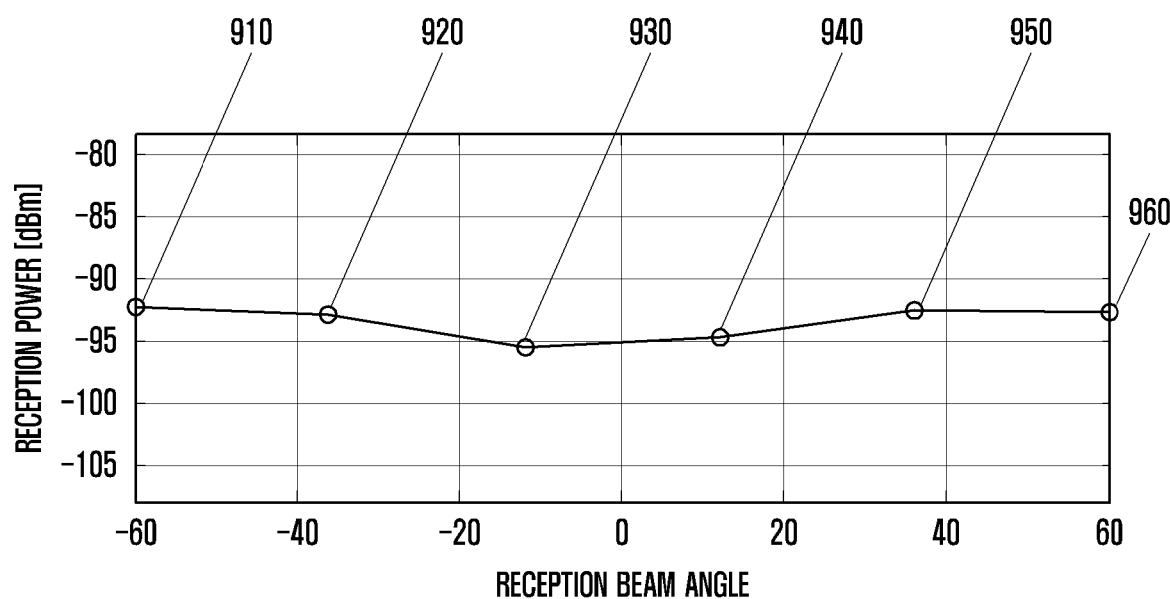
Figure 9C:
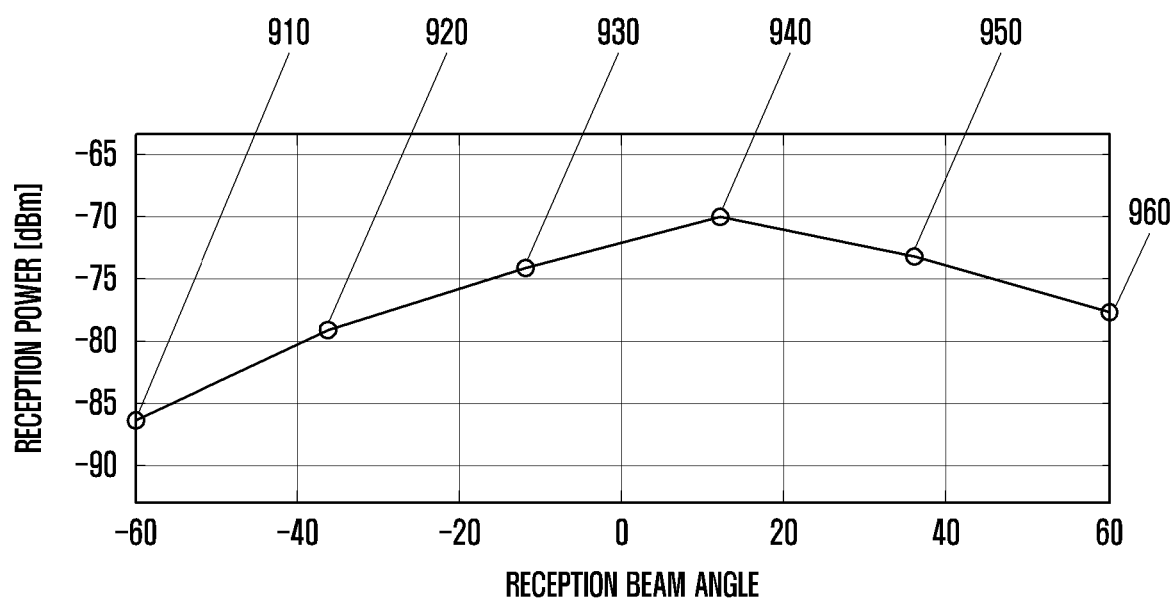

FIGS. 9A to 9C are diagrams illustrating examples of reception power measured according to a transmission condition in an electronic device according to various embodiments. An electronic device (e.g., the electronic device 101 in FIG. 1) may search for a plurality of reception beams in different directions (or angles) from each other. For example, in FIGS. 9A to 9C, an example of displaying angles formed by respective reception beams in the range of [−60°, +60° ] will be described.

FIG. 9A shows an example of reception power measured in the case where there is no transmission beam.

Referring to FIG. 9A, the reception power of a $1^{st}$ reception beam 910 may be measured to be −141 dBm, the reception power of a $2^{nd}$ reception beam 920 may be measured to be −153 dBm, the reception power of a $3^{rd}$ reception beam 930 may be measured to be −138 dBm, the reception power of a $4^{th}$ reception beam 940 may be measured to be −140 dBm, the reception power of a $5^{th}$ reception beam 950 may be measured to be −144 dBm, and the reception power of a $6^{th}$ reception beam 960 may be measured to be −143 dBm. In order to perform wireless communication, the reception power must be measured to be the minimum power (e.g., −120 dBm) or more, but the reception power of all reception beams may be measured to be lower than the minimum power. In this case, the processor 120 of the electronic device 101 or the first artificial neural network may determine the transmission condition to be "no transmission beam".

FIG. 9B shows an example of reception power measured in the case of NLOS.

Referring to FIG. 9B, the reception power of the 1st reception beam 910 may be measured to be −93 dBm, the reception power of the $2^{nd}$ reception beam 920 may be measured to be −94 dBm, the reception power of the $3^{rd}$ reception beam 930 may be measured to be −96 dBm, the reception power of the $4^{th}$ reception beam 940 may be measured to be −95 dBm, the reception power of the $5^{th}$ reception beam 950 may be measured to be −94 dBm, and the reception power of the $6^{th}$ reception beam 960 may be measured to be −93 dBm. In NLOS, the reception power of most reception beams may be measured to be higher than the minimum power. In this case, the processor 120 of the electronic device 101 or the first artificial neural network may determine the transmission condition to be "NLOS".

FIG. 9C shows an example of reception power measured in the case of LOS.

Referring to FIG. 9C, the reception power of the $1^{st}$ reception beam 910 may be measured to be −87 dBm, the reception power of the $2^{nd}$ reception beam 920 may be measured to be 80 dBm, the reception power of the $3^{rd}$ reception beam 930 may be measured to be −75 dBm, the reception power of the $4^{th}$ reception beam 940 may be measured to be −70 dBm, the reception power of the $5^{th}$ reception beam 950 may be measured to be −76 dBm, and the reception power of the $6^{th}$ reception beam 960 may be measured to be −77 dBm. In LOS, the reception power of most reception beams may be measured to be higher than the minimum power, a specific reception beam may have the maximum value, and the reception beam may be measured to have lower reception power as it goes away from the reception beam having the maximum value. In this case, the processor 120 of the electronic device 101 or the first artificial neural network may determine the transmission condition to be "LOS".

Referring to the reception power in FIGS. 9A to 9C, it can be seen that the reception beams adjacent to each other have a higher correlation in the reception power therebetween and that the reception beams far from each other have a lower correlation therebetween. The reception beam may be expressed as a direction vector of a unit size, and the degree of proximity between the two reception beams may be determined according to the magnitude of the absolute value of an angle between the direction vectors. Therefore, the processor 120 may sample only a smaller number (e.g., NS) of reception beams than the total number (e.g., NR) of reception beams (e.g., NS≥NR), and may select reception beams having a lowest correlation therebetween in order to obtain information on the total reception beams.

Figure 10A:
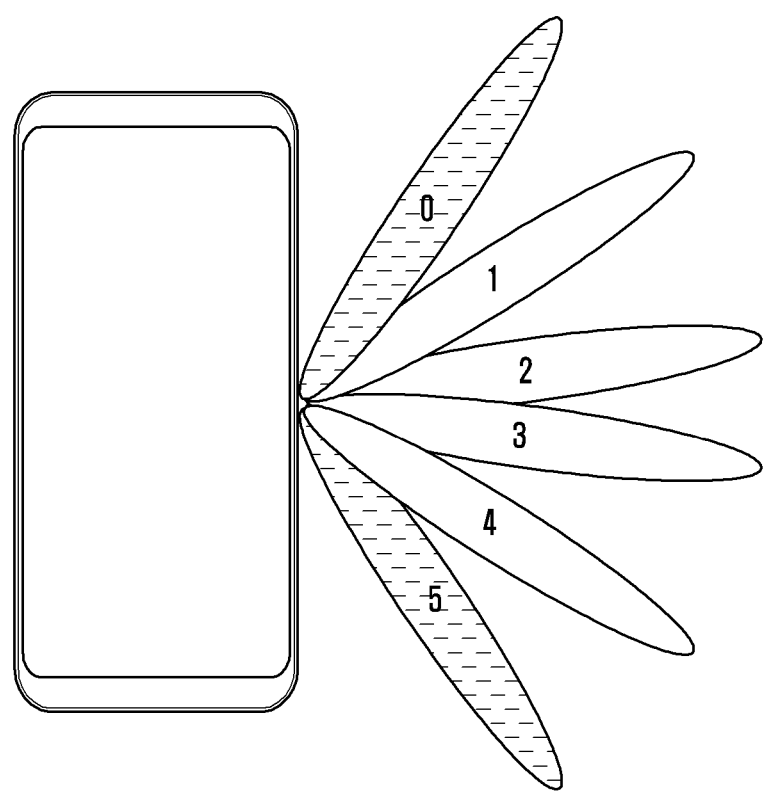
FIGS. 10A and 10B are diagrams illustrating an example of selecting a reception beam in an electronic device according to various embodiments.
Figure 10B:
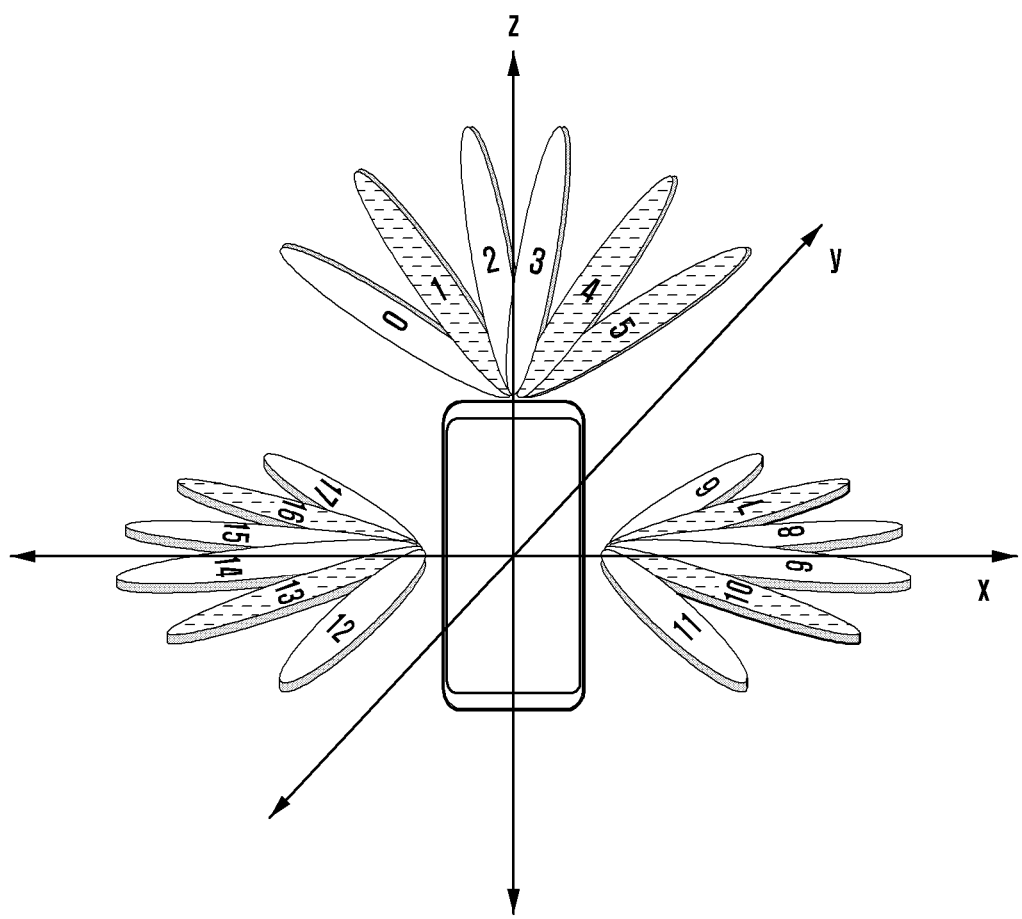

FIGS. 10A and 10B are diagrams illustrating an example of selecting a reception beam in an electronic device according to various embodiments.

FIG. 10A is a diagram illustrating an example of selecting a reception beam in an electronic device equipped with one antenna module.

Referring to FIG. 10A, an electronic device (e.g., the electronic device 101 in FIG. 1) according to various embodiments may include an antenna module (e.g., the antenna module 197 in FIG. 1, or the first antenna module 242 or the second antenna module 244 in FIG. 2) capable of generating 6 reception beams and mounted on the right side of the electronic device 101, thereby generating a total of 6 reception beams. The $1^{st}$ reception beam 0 may be adjacent to the $2^{nd}$ reception beam 1, the $2^{nd}$ reception beam 1 may be adjacent to the $3^{rd}$ reception beam 2, and the $3^{rd}$ reception beam 2 may be adjacent to the $4^{th}$ reception beam 3, the $4^{th}$ reception beam 3 may be adjacent to the $5^{th}$ reception beam 4, and the $5^{th}$ reception beam 4 may be adjacent to the $6^{th}$ reception beam 5. For example, the processor 120 may select a smaller number (e.g., NS=2) of reception beams than the total number (e.g., NR=6) of reception beams (e.g., NR) (e.g., 2≤6) such that the $1^{st}$ reception beam 0 and the $6^{th}$ reception beam 5, which are farthest away from each other, are selected.

FIG. 10B is a diagram illustrating an example of selecting a reception beam in an electronic device equipped with a plurality of antenna modules.

Referring to FIG. 10B, an electronic device (e.g., the electronic device 101 in FIG. 1) according to various embodiments may include antenna modules (e.g., the antenna module 197 in FIG. 1, and the first antenna module 242 and the second antenna module 244 in FIG. 2) capable of generating 6 reception beams and mounted on the top, right, and left sides of the electronic device 101, thereby generating a total of 18 reception beams. The processor 120 may select a smaller number (e.g., NS=6) of reception beams than the total number (e.g., NR=18) of reception beams (e.g., NR) (e.g., 6≤18) such that the reception beams, which are farthest away from each other, are selected. For example, the processor 120 may select the $2^{nd}$ reception beam 1 and the $5^{th}$ reception beam 4 from among the reception beams 0 to 5 generated by the antenna module mounted on the top of the electronic device 101. The processor 120 may select the $8^{th}$ reception beam 7 and the $11^{th}$ reception beam 10 from among the reception beams 6 to 11 generated by the antenna module mounted on the right side of the electronic device 101. The processor 120 may select the $14^{th}$ reception beam 13 and the $17^{th}$ reception beam 16 from among the reception beams 12 to 17 generated by the antenna module mounted on the left side of the electronic device 101.

According to various embodiments, as the number of selected reception beams (e.g., NS) increases, the accuracy of predicting an optimal reception beam increases, whereas the time and current required to search for the optimal reception beam may also increase. Accordingly, the processor 120 may adjust the number of selected reception beams, based on the total number of reception beams and an area covered by each reception beam. Although an example of selecting two reception beams from among six reception beams or selecting six reception beams from among 18 reception beams has been described in the drawing, the number of selected reception beams may be larger or smaller than this.

Figure 11:
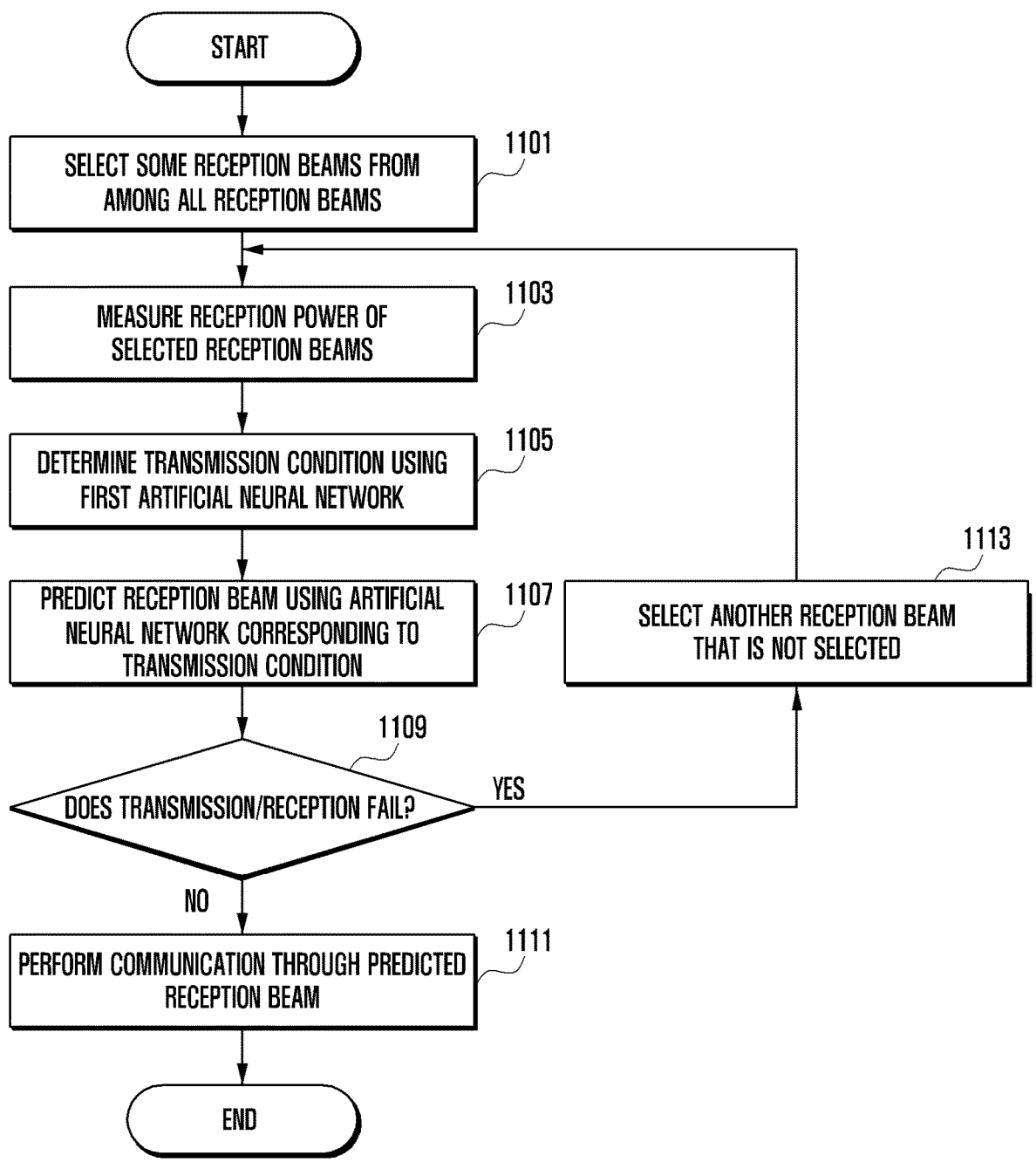
FIG. 11 is a flowchart illustrating a method of selecting a reception beam, based on an artificial neural network in an electronic device according to various embodiments.

FIG. 11 is a flowchart illustrating a method of selecting a reception beam based on an artificial neural network in an electronic device according to various embodiments.

Referring to FIG. 11, in operation 1101, a processor (e.g., processor 120 in FIG. 1) of an electronic device (e.g., the electronic device 101 in FIG. 1) according to various embodiments may select some reception beams from among all reception beams. The processor 120 (e.g., the reception beam determination module 710) may select at least two reception beams, which are not adjacent to each other, from among all reception beams capable of being generated. For example, referring to FIG. 10A, in the case where a total of six reception beams 0 to 5 are generated, the processor 120 may select the $1^{st}$ reception beam 0 and the $6^{th}$ reception beam 5. Alternatively, in the case where a total of 18 reception beams 0 to 17 are generated, the processor 120 may select the 1st reception beam 0, the 6th reception beam 5, the 7th reception beam 6, the 12th reception beam 11, the 13th reception beam 12, and the 18th reception beam 17.

In operation 1103, the processor 120 (e.g., the power measurement module 720) may measure reception power of the selected reception beams. For example, if the selected reception beam is the 1st reception beam (e.g., the 1st reception beam 0 in FIG. 10A), the processor 120 may fix the beam in the first direction of the 1st reception beam 0, and may measure reception power of the 1st reception beam 0 using an SS/PBCH block signal received from a base station (e.g., the base station 420 in FIG. 4). The processor 120 may measure the reception power using a CSI-RS received from the base station 420.

In operation 1105, the processor 120 (e.g., the artificial neural network module 740) may determine a transmission condition using a first artificial neural network. The first artificial neural network may be an artificial neural network that determines the transmission condition. The processor 120 may input the measured reception power to the first artificial neural network. The first artificial neural network may determine the transmission condition to be at least one of no transmission beam, NLOS, or LOS using the input reception power. For example, the first artificial neural network may determine the transmission condition to be "no transmission beam" if the reception power is less than the minimum power (e.g., −120 dBm), and may determine the transmission condition to be "NLOS" or "LOS" if the reception power exceeds the minimum power. For example, the first artificial neural network may determine the transmission condition to be "NLOS" if the difference in the reception power is less than a reference value (e.g., 5 dBm or 10 dBm), and may determine the transmission condition to be "LOS" if the difference in the reception power exceeds the reference value (e.g., 5 dBm or 10 dBm).

In operation 1107, the processor 120 (e.g., the artificial neural network module 740) may predict a reception beam using an artificial neural network corresponding to the transmission condition. The processor 120 may input an output value of the first artificial neural network to different artificial neural network algorithms depending on the transmission condition, thereby predicting the reception beam. Referring to FIG. 10A, the processor 120 may predict the 3rd reception beam 2 as an optimal reception beam using the selected reception beams (e.g., the 1st reception beam 0 and the 6th reception beam 5).

According to various embodiments, if the transmission condition is determined to be "NLOS", the processor 120 may input an output value of the first artificial neural network to an artificial neural network (e.g., the second artificial neural network) corresponding to "NLOS", thereby predicting the reception beam. In addition, if the transmission condition is determined to be "LOS", the processor 120 may input an output value of the first artificial neural network to an artificial neural network (e.g., the third artificial neural network) corresponding to "LOS", thereby predicting the reception beam. However, if the transmission condition is determined to be "no transmission beam", the processor 120 may perform a reception beam reselection process. The reception beam reselection process may indicate an operation of selecting unselected reception beams other than the reception beams previously (e.g., primarily) selected for prediction of a reception beam and predicting a reception beam according thereto. For example, if the transmission condition is determined to be "no transmission beam", the processor 120 may perform operations 1101 to 1107 on the reception beams that are not selected.

In operation 1109, the processor 120 (e.g., the reception beam determination module 710) may determine (or predict) whether or not transmission/reception through the predicted reception beam will fail (e.g., communication failure). When connecting wireless communication, the electronic device 101 may perform a communication connection only if the signal intensity or signal quality is greater than or equal to a predetermined value. To this end, the processor 120 may predict whether or not a communication connection is possible using the reception beam predicted by the artificial neural network. If it is determined that transmission/reception through the predicted reception beam will fail, the processor 120 may perform operation 1113, and if it is determined that transmission/reception to the predicted reception beam will not fail, the processor 120 may perform operation 1111.

According to various embodiments, a method of determining (or predicting) failure of transmission/reception may be predicting an error rate (e.g., a downlink BLER) of the predicted reception beam, or may be determining the reception power (e.g., RSRP) of the predicted reception beam. An example of determining success or failure of transmission/reception according to an error rate of the predicted reception beam will be described with reference to FIG. 11. The processor 120 may perform operation 1113 if an error rate of the predicted reception beam is greater than or equal to a threshold (e.g., "YES" in determining success or failure of transmission/reception), and may operation 1111 if the error rate of the predicted reception beam is less than the threshold (e.g., "NO" in determining success or failure of transmission/reception).

If it is determined that the transmission/reception will not fail (e.g., "NO" in determining success or failure of transmission/reception), in operation 1111, the processor 120 (e.g., the reception beam determination module 710) may perform communication through the predicted reception beam. The processor 120 may fix the antenna module (e.g., the antenna module 197 in FIG. 1, or the first antenna module 242 and the second antenna module 244 in FIG. 2) in the direction (or angle) of the predicted reception beam, and may communicate with a base station (e.g., the base station 420 in FIG. 4).

If it is determined that the transmission/reception will fail (e.g., "YES" in determining success or failure of transmission/reception), in operation 1113, the processor 120 (e.g., the reception beam determination module 710) may select another reception beam that is not selected. Referring to FIG. 10A, in the case where the 1st reception beam 0 and the 6th reception beam 5 are selected from among the six reception beams in operation 1101, the processor 120 may select the 2nd reception beam 1 and the 5th reception beam 4 in operation 1113. After performing operation 1113, the processor 120 may return to operation 1103. The processor 120 may perform a reception beam prediction process on the unselected reception beams. The reception beam prediction process may include operations 1103 to 1107. For example, the reception beam prediction process may be measuring the reception power of the reception beams and predicting an optimal reception beam.

According to various embodiments, if it is determined that the transmission/reception will fail, the processor 120 may terminate the procedure. Although the processor 120 predicts the reception beam using the artificial neural network corresponding to the transmission condition, if it is determined (or predicted) that the transmission/reception through the predicted reception beam will fail, the processor 120 may terminate the procedure without performing operation 1113 for changing the artificial neural network. The processor 120 may change the artificial neural network, and may reperform operations 1101 to 1107. This is only a matter of implementation, and the disclosure is not limited to FIG. 11.

According to various embodiments, if it is determined that the transmission/reception will fail, the processor 120 may predict (or determine) whether or not transmission/reception will fail through a reception beam having a low predicted error rate or best reception power among the selected reception beams. If it is determined that the transmission/reception will fail through the reception beam having a low predicted error rate or best reception power, the processor 120 may perform a reception beam prediction process on the reception beams that are not selected. The processor 120 may perform operations 1103 to 1107 on all of the unselected reception beams.

Figure 12:
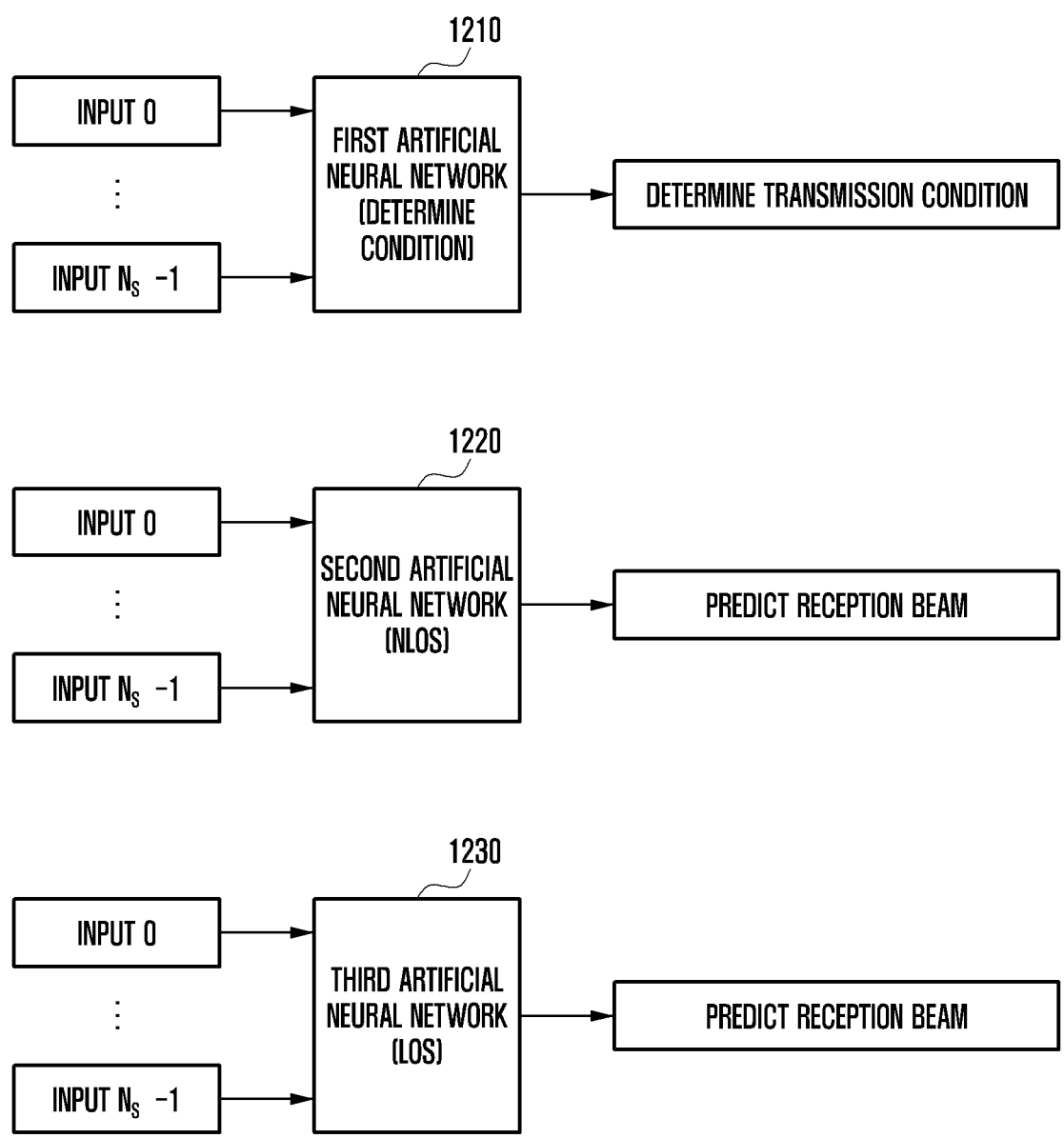
FIG. 12 is a diagram illustrating an example of using different artificial neural networks according to various embodiments.

FIG. 12 is a diagram illustrating an example of using different artificial neural networks according to various embodiments.

Referring to FIG. 12, a processor (e.g., the processor 120 in FIG. 1) of an electronic device (e.g., the electronic device 101 in FIG. 1) according to various embodiments may predict an optimal reception beam using a first artificial neural network 1210, a second artificial neural network 1220, and a third artificial neural network 1230. For example, the processor 120 may input reception power (e.g., input 0 to input Ns-1) of a selected reception beam to the first artificial neural network 1210. The processor 120 may determine a transmission condition using the first artificial neural network 1210. The processor 120 may predict an optimal reception beam using the second artificial neural network 1220 or the third artificial neural network 1230 depending on the transmission condition. For example, if the transmission condition is "NLOS", the processor 120 may input an output value (e.g., input 0 to input Ns-1) of the first artificial neural network 1210 to the second artificial neural network 1220. If the transmission condition is "LOS", the processor 120 may input an output value (e.g., input 0 to input Ns-1) of the first artificial neural network 1210 to the third artificial neural network 1230.

The first artificial neural network 1210, the second artificial neural network 1220, or the third artificial neural network 1230 learned different statistical characteristics, and may output different values from each other in response to an input value. Therefore, the processor 120 may predict an optimal reception beam using different artificial neural networks depending on the transmission condition.

Figure 13:
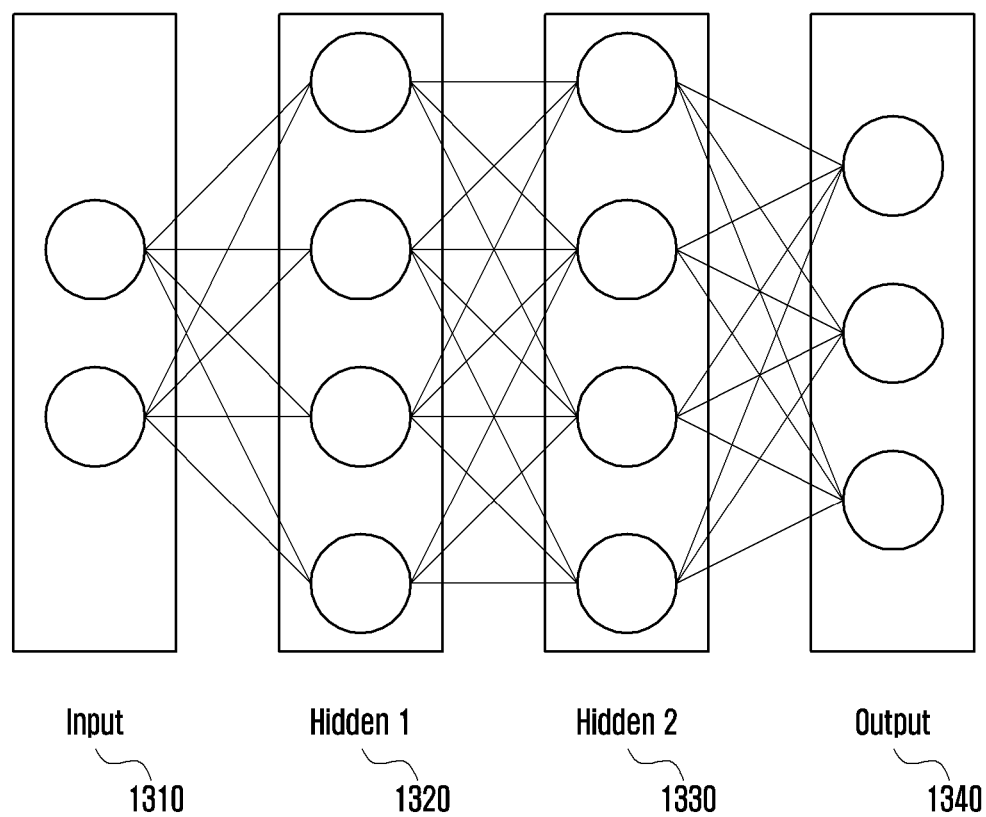
FIG. 13 is a diagram illustrating an artificial neural network algorithm according to various embodiments.

FIG. 13 is a diagram illustrating an artificial neural network algorithm according to various embodiments.

Referring to FIG. 13, the artificial neural network may be a learning algorithm inspired by a neural network in biology. It may be a nonlinear model in which artificial neurons that form a network by synaptic connection changes the strength of the synaptic connection by learning, thereby obtaining problem-solving ability. The basic artificial neural network algorithm generally used is a multi-layer neural network, and may include an input layer, a hidden layer, and an output layer. Each layer may be configured as nodes.

In the disclosure, although it is described that an artificial neural network is configured as one input layer 1310, two hidden layers 1320 and 1330, and one output layer 1340, the disclosure is not limited thereto. For example, the input layer 1310 may have two nodes, the first hidden layer 1320 and the second hidden layer 1340 may have four nodes, and the output layer 1340 may have three nodes. A value of a prediction variable (e.g., an input variable) for deriving a prediction value (e.g., an optimal reception beam) may be input to the input layer 1310. If there are n input values, the input layer 1310 may have n nodes. The first hidden layer 1320 and the second hidden layer 1340 may receive input values from all input nodes, may calculate a weight, may apply the weight to an evaluation function, and may transmit the same to the output layer 1340. Both the respective input nodes and the hidden nodes may be connected by a network having a weight, and the hidden nodes and the output nodes may be connected in the same manner. The number of nodes included in the first hidden layer 1320 and the second hidden layer 1340 may be increased or reduced through learning.

Figure 14:
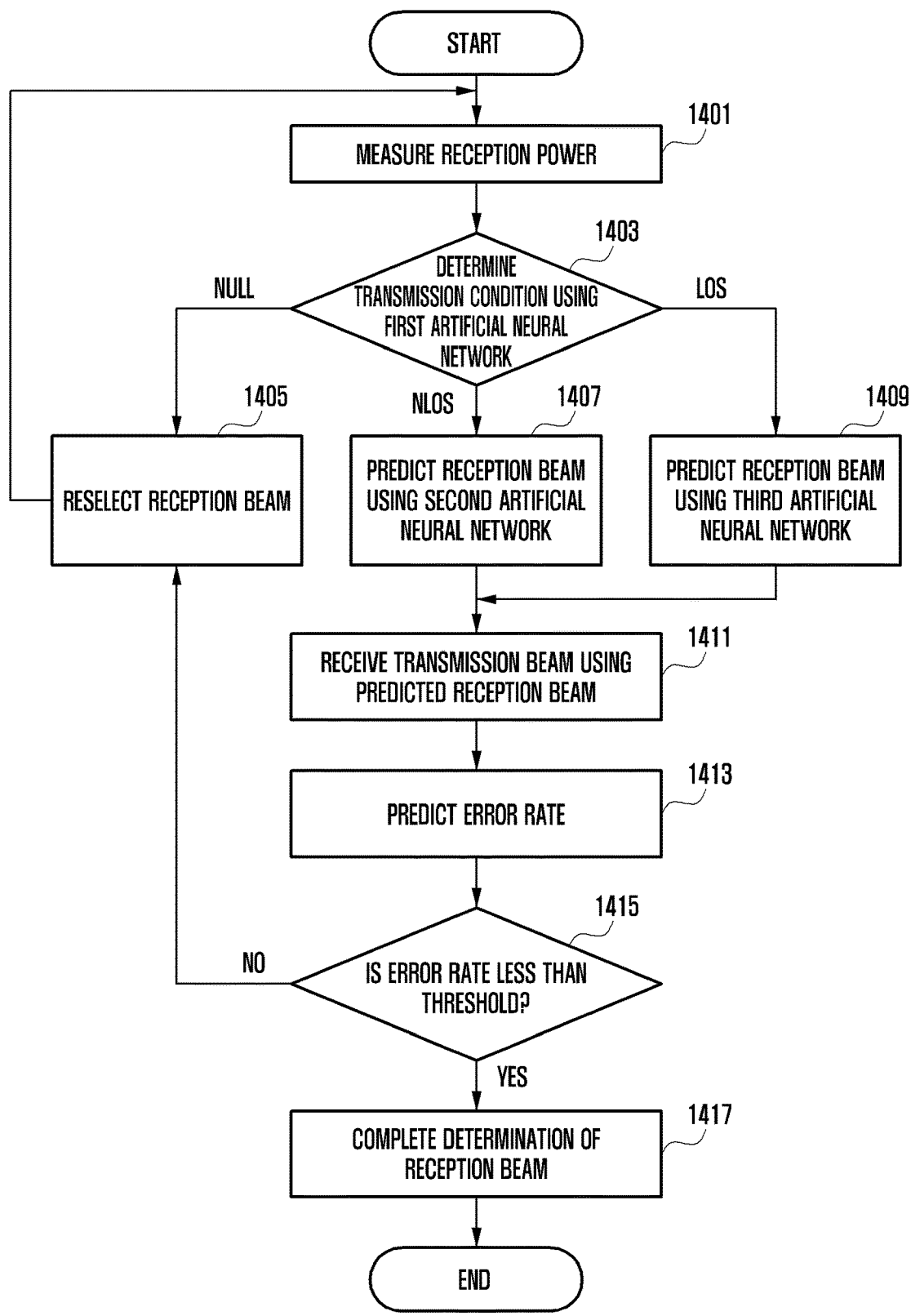
FIG. 14 is a flowchart illustrating a method of predicting a reception beam, based on an artificial neural network in an electronic device according to various embodiments.

FIG. 14 is a flowchart illustrating a method of predicting a reception beam based on an artificial neural network in an electronic device according to various embodiments.

Referring to FIG. 14, in operation 1401, a processor (e.g., processor 120 in FIG. 1) of an electronic device (e.g., the electronic device 101 in FIG. 1) may measure reception power. The processor 120 (e.g., the power measurement module 720) may measure reception power of a selected reception beam. Since operation 1401 is the same as or similar to operation 803 in FIG. 8 and operation 1103 in FIG. 11, a detailed description thereof will be omitted.

In operation 1403, the processor 120 (e.g., the artificial neural network module 740) may determine a transmission condition using the first artificial neural network. The first artificial neural network may be an artificial neural network that determines a transmission condition. The processor 120 may input the measured reception power to the first artificial neural network. The first artificial neural network may determine the transmission condition to be at least one of no transmission beam, NLOS, or LOS using the input reception power. Since operation 1403 is the same as or similar to operation 805 in FIG. 8 and operation 1105 in FIG. 11, a detailed description thereof will be omitted.

The processor 120 may perform operation 1405 if the transmission condition is "no transmission beam", may perform operation 1407 if the transmission condition is "NLOS", and may perform operation 1409 if the transmission condition is "LOS".

In the case where the transmission condition is "no transmission beam", in operation 1405, the processor 120 (e.g., the power measurement module 720) may reselect reception beams. For example, the processor 120 may select unselected reception beams other than the reception beams selected for prediction of a reception beam. After performing operation 1405, the processor 120 may return to operation 1401. The processor 120 may measure reception power for the unselected reception beams. For example, in operation 1401, the processor 120 may measure reception power of the reception beams selected in operation 1405. In addition, the processor 120 may return to operation 1405 after performing operation 1415.

In the case where the transmission condition is "NLOS", in operation 1407, the processor 120 (e.g., the artificial neural network module 740) may predict a reception beam using the second artificial neural network. For example, if the transmission condition is determined to be "NLOS", the processor 120 may input an output value of the first artificial neural network to the second artificial neural network, thereby predicting the reception beam. The processor 120 may perform operation 1411 after performing operation 1407.

In the case where the transmission condition is "LOS", in operation 1409, the processor 120 (e.g., the artificial neural network module 740) may predict a reception beam using the third artificial neural network. For example, if the transmission condition is determined to be "LOS", the processor 120 may input an output value of the first artificial neural network to the third artificial neural network, thereby predicting the reception beam. The processor 120 may perform operation 1411 after performing operation 1409.

In operation 1411, the processor 120 (e.g., the reception beam determination module 710) may receive a transmission beam using the predicted reception beam. In order to determine whether or not a communication connection is possible through the predicted reception beam, the processor 120 may fix the beam in the direction of the predicted reception beam, and may receive a transmission beam (e.g., the SSB set).

In operation 1413, the processor 120 (e.g., the reception beam determination module 710) may predict an error rate. The processor 120 may measure a downlink BLER (or reception power (e.g., RSRP)) using a signal (e.g., an SS/PBCH block, CSI, or a CSI-RS) included in the transmission beam. The processor 120 may predict an error rate, based on the measured reception power.

In operation 1415, the processor 120 (e.g., the reception beam determination module 710) may determine whether or not the predicted error rate is less than a threshold. If the predicted error rate is greater than or equal to a threshold, data transmission/reception may fail. The processor 120 may perform operation 1417 if the predicted error rate is less than the threshold (YES), and may return to operation 1405 if the predicted error rate is greater than or equal to the threshold (NO).

If the predicted error rate is less than the threshold, in operation 1417, the processor 120 (e.g., the reception beam determination module 710) may complete determination of the reception beam. The processor 120 may complete determination of an optimal reception beam using the artificial neural network. The processor 120 may perform communication through the determined reception beam while the transmission beam is not changed or while the posture of the electronic device 101 remains. However, if the transmission beam is changed or if the posture of the electronic device 101 is changed, the processor 120 may perform an optimal-reception beam prediction process. The optimal-reception beam prediction process may be performing operations included in FIGS. 8, 11, and 15.

Figure 15:
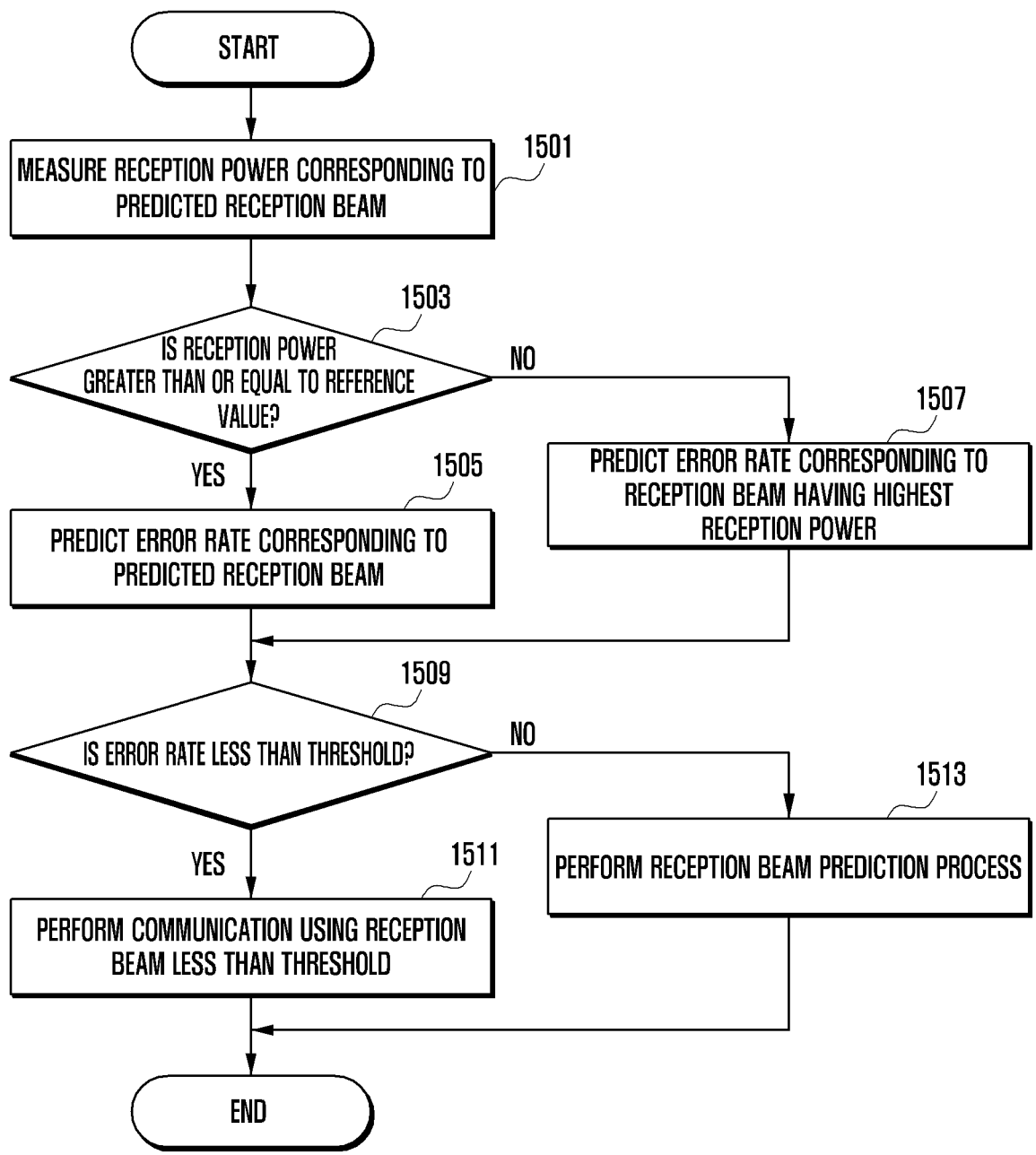
FIG. 15 is a detailed flowchart illustrating a method of determining a reception beam, based on an artificial neural network in an electronic device according to various embodiments.

FIG. 15 is a detailed flowchart illustrating a method of determining a reception beam based on an artificial neural network in an electronic device according to various embodiments.

Referring to FIG. 15, in operation 1501, a processor (e.g., the processor 120 in FIG. 1) of an electronic device (e.g., the electronic device 101 in FIG. 1) may measure reception power (or signal intensity) corresponding to a predicted reception beam. The processor 120 (e.g., the power measurement module 720) may measure reception power (e.g., RSRP) of the predicted reception beam using an SS/PBCH block signal included in the transmission beam received through the predicted reception beam.

In operation 1503, the processor 120 (e.g., the reception beam determination module 710) may determine whether or not the reception power is greater than or equal to a reference value. When connecting wireless communication, the electronic device 101 may measure the signal intensity or signal quality, and may perform a communication connection only if the signal intensity or signal quality is greater than or equal to a predetermined value. To this end, the processor 120 may predict whether or not the reception power of the predicted reception beam has signal intensity suitable for a communication connection. The processor 120 may perform operation 1505 if the reception power of the predicted reception beam is greater than or equal to the reference value (YES), and may perform operation 1507 if the reception power of the predicted reception beam is less than the reference value (NO).

If the reception power of the predicted reception beam is greater than or equal to the reference value (YES), in operation 1505, the processor 120 (e.g., the reception beam determination module 710) may predict an error rate corresponding to the predicted reception beam. The processor 120 may predict a downlink BLER as the error rate using a signal (e.g., an SS/PBCH block, CSI, or a CSI-RS) included in a transmission beam received through the predicted reception beam. After performing operation 1505, the processor 120 may perform operation 1509.

If the reception power of the predicted reception beam is less than the reference value (NO), in operation 1507, the processor 120 (e.g., the reception beam determination module 710) may predict an error rate corresponding to a reception beam having the highest reception power. If the reception power of the predicted reception beam is less than the reference value, the processor 120 may predict an error rate corresponding to a reception beam having the highest reception power among the reception beams whose reception power was measured. Referring to FIG. 10A, although the processor 120 predicts the $3^{rd}$ reception beam 2 as the optimal reception beam using the $1^{st}$ reception beam 0 and the $6^{th}$ reception beam 5, if the reception power of the $3^{rd}$ reception beam is less than a reference value, the processor may predict an error rate of the reception beam having higher reception power among the $1^{st}$ reception beam 0 and the $6^{th}$ reception beam 5. For example, if the $1^{st}$ reception beam 0 has higher reception power among the $1^{st}$ reception beam 0 and the $6^{th}$ reception beam 5, the processor 120 may predict an error rate corresponding to the first reception beam 0. The processor 120 may predict a downlink BLER as the error rate using the signal included in a transmission beam received through the first reception beam 0. After performing operation 1507, the processor 120 may perform operation 1509.

In operation 1509, the processor 120 (e.g., the reception beam determination module 710) may determine whether or not the predicted error rate is less than a threshold. If the error rate corresponding to the predicted reception beam is predicted in operation 1505, the processor 120 may determine whether or not the predicted error rate of the predicted reception beam is less than a threshold. Alternatively, if the error rate corresponding to the reception beam having the highest reception power is predicted in operation 1507, the processor 120 may determine whether or not the predicted error rate of the reception beam having the highest reception power is less than a threshold. The processor 120 may perform operation 1511 if the predicted error rate is less than the threshold (YES), and may perform operation 1513 if the predicted error rate is greater than or equal to the threshold (NO).

If the predicted error rate is less than the threshold (YES), in operation 1511, the processor 120 (e.g., the reception beam determination module 710) may perform communication using the reception beam less than a threshold. If the error rate of the predicted reception beam is less than the threshold, the processor 120 may perform communication using the predicted reception beam. If the error rate of the reception beam having the highest reception power is less than the threshold, the processor 120 may perform communication using the reception beam having the highest reception power.

If the predicted error rate is greater than or equal to the threshold (NO), in operation 1513, the processor 120 (e.g., the reception beam determination module 710) may perform a reception beam prediction process. The reception beam prediction process may be predicting an optimal reception beam by measuring reception power of the reception beam. The processor 120 may predict an optimal reception beam using the remaining reception beams, excluding the reception beams used to obtain the "predicted reception beam" used in operation 1501.

Figure 16:
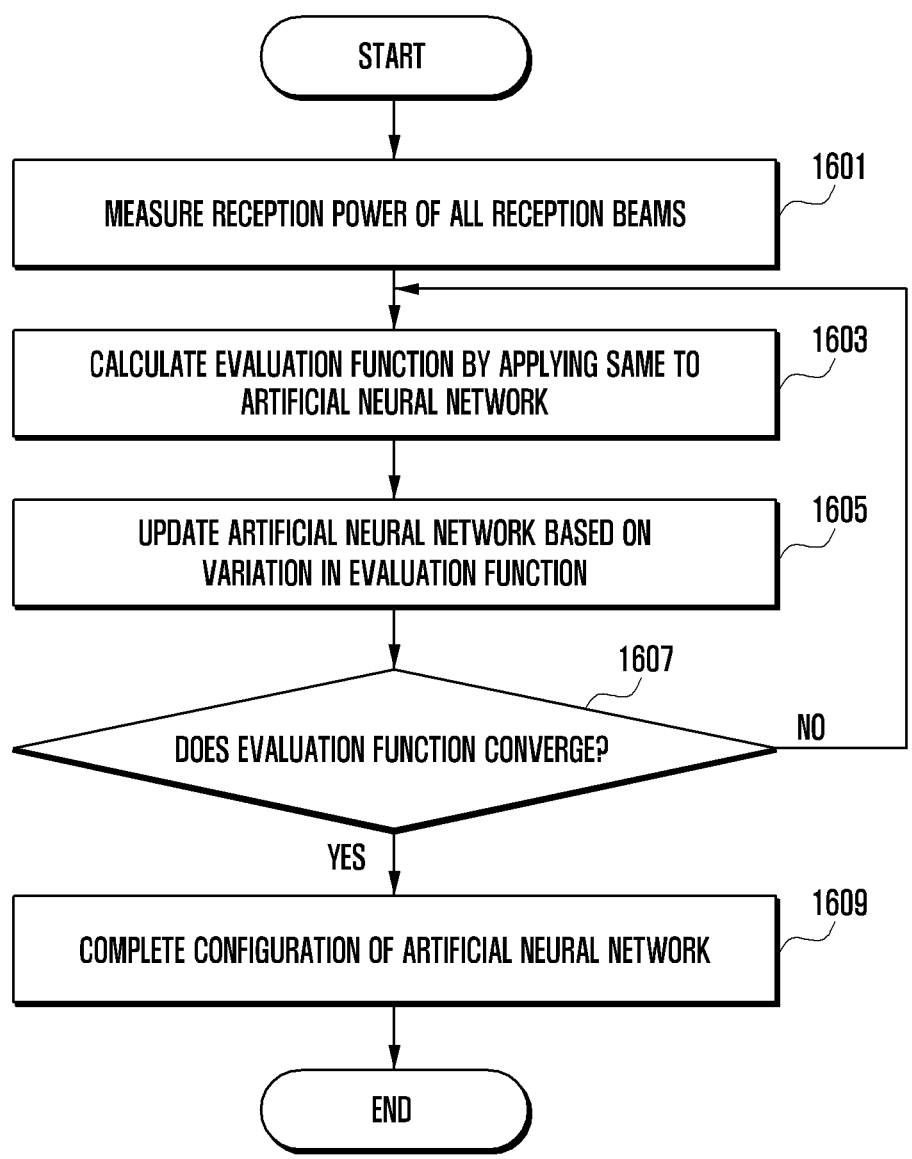
FIG. 16 is a flowchart illustrating a method of operating an artificial neural network according to various embodiments.

FIG. 16 is a flowchart illustrating an operation method of an artificial neural network according to various embodiments.

Referring to FIG. 16, in operation 1601, a processor (e.g., the processor 120 in FIG. 1) of an electronic device (e.g., the electronic device 101 in FIG. 1) may measure reception power of all reception beams. The artificial neural network observed and learned all reception beams in advance. To this end, the processor 120 may measure reception power for all reception beams capable of being generated by the electronic device 101.

In operation 1603, the processor 120 (e.g., the artificial neural network module 740) may apply the power to the artificial neural network, thereby calculating an evaluation function. The processor 120 may calculate an evaluation function by applying the measured reception power to the artificial neural network. The evaluation function may be calculated using the difference between a predicted reception beam vector and an actually optimal reception beam vector obtained through searching of all reception beams. The artificial neural network may be at least one of a first artificial neural network for determining a transmission condition, a second artificial neural network corresponding to "NLOS", and a third artificial neural network corresponding to "LOS". The processor 120 may perform operations 1601 to 1609 for each artificial neural network.

In operation 1605, the processor 120 (e.g., the artificial neural network module 740) may update (e.g., learn) the artificial neural network, based on the variation in the evaluation function. The artificial neural network may include an input layer (e.g., the input layer 1310 in FIG. 13), a hidden layer (the first hidden layer 1320 and the second hidden layer 1330 in FIG. 13), and an output layer (e.g., the output layer 1340 in FIG. 13), and the hidden layer may receive input values from all input nodes, may calculate a weighted sum, may apply this value to an evaluation function, and may transmit the same to the output layer 1340. In this case, the weight is expressed as connection strength, and may be initially given randomly, and may then be adjusted to a value capable of accurately estimating the prediction value. The evaluation function is a nonlinear function, and since a prediction value is transmitted to the output layer through the evaluation function, the artificial neural network may learn by changing the evaluation function so as to derive the most optimal prediction value.

The evaluation function may be calculated using the difference between a predicted reception beam vector and an actually optimal reception beam vector obtained through searching of all reception beams. For example, the processor 120 may calculate the evaluation function until the evaluation function converges on a specific reference value or below.

In operation 1607, the processor 120 (e.g., the artificial neural network module 740) may determine whether or not the evaluation function converges. The processor 120 may calculate the evaluation function until the evaluation function converges on a specific reference value or below. For example, the processor 120 may learn the artificial neural network by changing the evaluation function so as to derive the most optimal prediction value (e.g., predict an optimal reception beam). The artificial neural networks may be learned based on the statistical characteristics of beam distribution. For example, if the statistical characteristics of the transmission/reception beams are the same as the previously learned beam distribution, the previously learned artificial neural network may be reused, and if the statistical characteristics are different from the same, it must be learned again. The processor 120 may perform an operation 1609 if the evaluation function converges (YES), and may return to operation 1603 if the evaluation function does not converge (NO).

If the evaluation function converges (YES), in operation 1609, the processor 120 (e.g., the artificial neural network module 740) may complete configuration of the artificial neural network. For example, if the artificial neural network predicts the most optimal reception beam using the statistical characteristics of the transmission/reception beams, the processor 120 may terminate learning of the artificial neural network. The processor 120 may allow the artificial neural network to learn until the most optimal reception beam is predicted.

Although FIG. 16 shows that learning of the artificial neural network is performed in the electronic device 101, learning of the artificial neural network may be performed in an external device (e.g., the server 108), and the electronic device 101 may download the learned artificial neural network. Alternatively, the electronic device 101 may use the artificial neural network through the server 108 whenever predicting an optimal reception beam.

Figure 17:
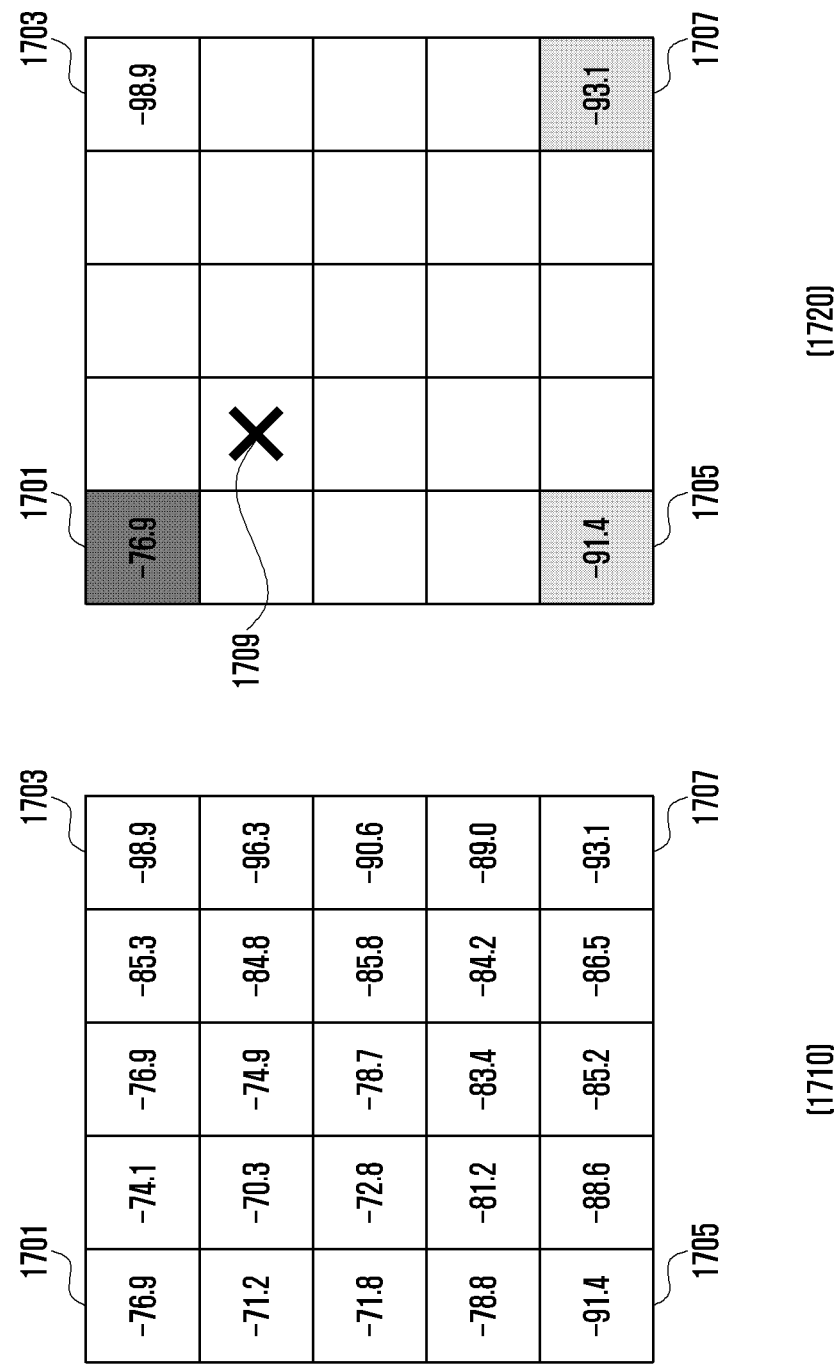
FIGS. 17 and 18 are diagrams illustrating an example of simulation of selecting an optimal reception beam using an artificial neural network according to various embodiments.
Figure 18:
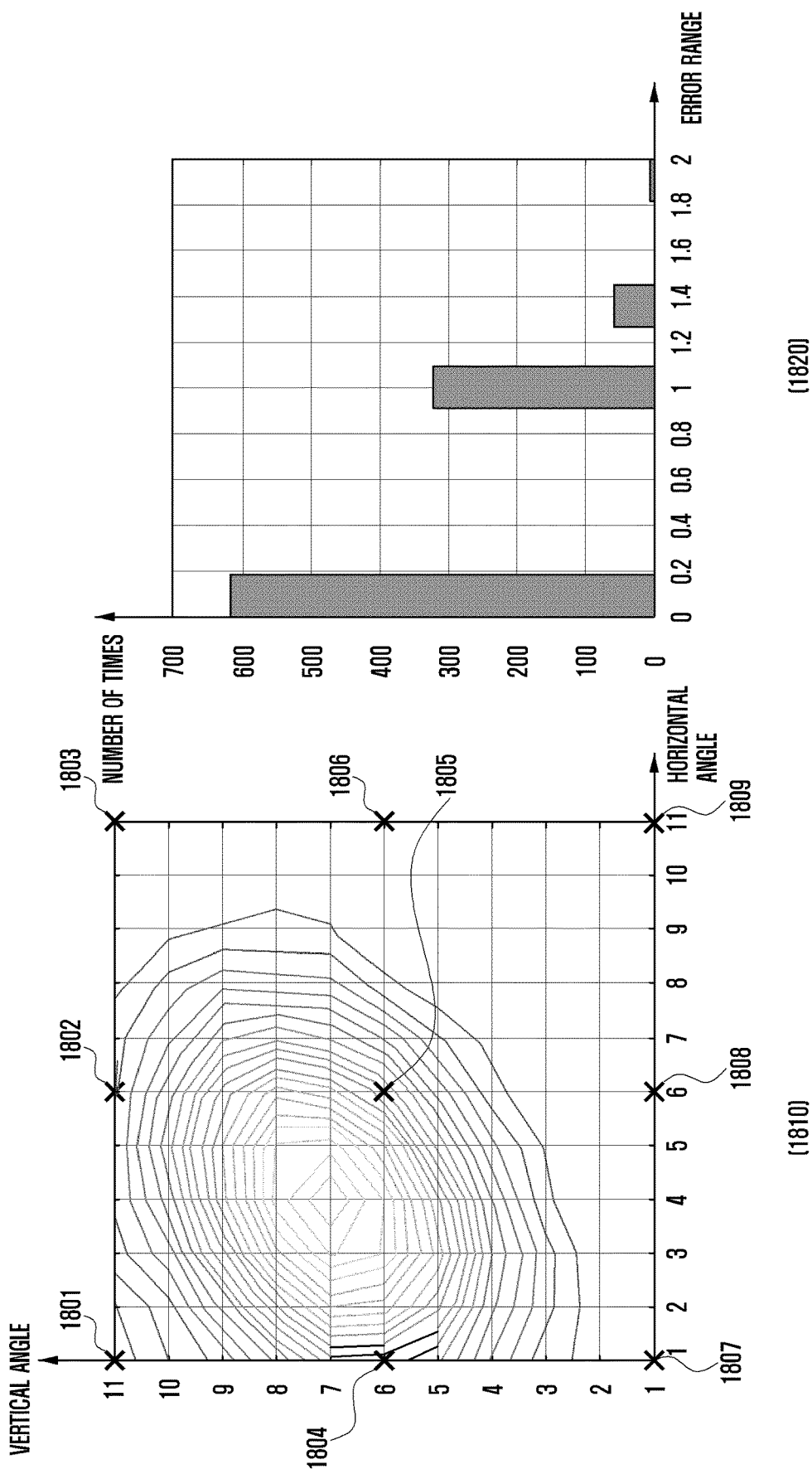

FIGS. 17 and 18 are diagrams illustrating an example of simulation of selecting an optimal reception beam using an artificial neural network according to various embodiments.

Referring to FIG. 17, the reception power measurement simulation 1710 shows the reception power of 25 reception beams in the case where an electronic device (e.g., the electronic device 101 in FIG. 1) is able to generate 25 reception beams. It can be seen that all reception beams are measured to have evenly high reception power in the reception power measurement simulation 1710. The reception beam prediction simulation 1720 shows an example of predicting an optimal reception beam (e.g., the $7^{th}$ reception beam 1709) using four reception beams (e.g., 1701, 1703, 1705, and 1707) among 25 reception beams. The processor (e.g., the processor 120 in FIG. 1) may select the 1st reception beam 1701, the $5^{th}$ reception beam 1703, the $21^{st}$ reception beam 1705, and the $25^{th}$ reception beam 1707, which are separated far from each other, using an artificial neural network. The artificial neural network may determine a transmission condition using the reception power of each of the $1^{st}$ reception beam 1701, the $5^{th}$ reception beam 1703, the $21^{st}$ reception beam 1705, and the $25^{th}$ reception beam 1707, and may predict the $7^{th}$ reception beam 1709 as an optimal reception beam using the artificial neural network according to the determined transmission condition.

Referring to FIG. 18, the reception power measurement simulation 1810 shows reception power of 121 reception beams in the case where an electronic device (e.g., the electronic device 101 in FIG. 1) is able to generate 121 reception beams. A processor (e.g., the processor 120 in FIG. 1) may select 9 reception beams 1801 to 1809 from among the 121 reception beams. The artificial neural network may predict an optimal reception beam using reception power of the reception beams selected by the processor 120. The reception power measurement simulation 1810 may indicate that the smaller the shape of the closed curve, the better the reception power. For example, when the nine reception beams 1801 to 1809 are named from the 1st reception beam to the $9^{th}$ reception beam in ascending order, the $5^{th}$ reception beam 1805 may have the best reception power. The $2^{nd}$ reception beam 1802 and the $4^{th}$ reception beam 1804 may have next best reception power after the $5^{th}$ reception beam 1805, the reception power of the $1^{st}$ reception beam 1801 may be worse than that of the $2^{nd}$ reception beam 1802 and the $4^{th}$ reception beam 1804, and the $3^{rd}$ reception beam 1803, the $6^{th}$ reception beam 1806, the $7^{th}$ reception beam 1807, the $8^{th}$ reception beam 1808, and the $9^{th}$ reception beam 1809 may have poor reception power.

The error range simulation 1820 indicates an error range in the case of simulating, a predetermined number of times or more, a process of predicting an optimal reception beam by selecting some reception beams from among all of the reception beams. For example, the error range simulation 1820 shows that a correct optimal reception beam is detected 612 times, an error of 1 in the reception beam coordinates is detected 323 times, and a diagonal direction error of ($\sqrt{2}$+1.414) in which an error on each of the x-axis and y-axis is 1 is detected 56 times in the case where the reception beam prediction process is simulated 1000 times. It can be seen that it is possible to effectively predict an optimal reception beam using some reception beams, instead of all reception beams, with a small error range when taking into consideration that the optimal reception beam was predicted using some reception beams.

An operation method of an electronic device according to various embodiments of the disclosure may include: selecting some reception beams from among a plurality of reception beams in different directions from each other; measuring reception power of the selected reception beams; determining a transmission condition through an artificial neural network, based on the measured reception power; and determining a reception beam for a communication connection using an artificial neural network corresponding to the transmission condition.

The transmission condition may include at least one of NLOS or LOS, and the determining of the reception beam may include predicting a reception beam using an artificial neural network corresponding to the transmission condition.

The predicting may include, if the transmission condition is "NLOS", predicting a reception beam using an artificial neural network corresponding to "NLOS", and, if the transmission condition is "LOS", predicting a reception beam using an artificial neural network corresponding to "LOS".

The determining of the reception beam may include predicting a reception beam using an artificial neural network corresponding to the transmission condition, measuring reception power of the predicted reception beam, predicting an error rate of the predicted reception beam if the measured reception power is greater than or equal to a reference value, and determining the predicted reception beam to be a reception beam for a communication connection if the predicted error rate is less than a threshold.

The method may further include predicting an error rate of a reception beam having the highest reception power among the reception beams whose reception power was measured if the measured reception power is less than a reference value, and determining the reception beam having the highest reception power to be a reception beam for a communication connection if the predicted error rate is less than a threshold.

Various embodiments of the disclosure disclosed in this specification and drawings are only specific examples provided to easily explain the technical details of the disclosure and to aid understanding of the disclosure, and are not intended to limit the scope of the disclosure. Therefore, the scope of the disclosure should be construed to encompass all changes or modifications derived based on the technical idea of the disclosure in addition to the embodiments disclosed herein.

The invention claimed is:

1. An electronic device comprising:
    an antenna module configured to form a plurality of reception beams in different directions; and
    a processor operatively connected to the antenna module, wherein the processor is configured to
    select some reception beams from among the plurality of reception beams,
    measure reception power of the selected reception beams,
    determine a transmission condition through an artificial neural network, based on the measured reception power, and
    determine a reception beam for a communication connection using an artificial neural network corresponding to the transmission condition.

2. The electronic device of claim 1, wherein the processor is configured to select at least two reception beams, which are not adjacent to each other, from among the plurality of reception beams.

3. The electronic device of claim 1, wherein the processor is configured to determine the transmission condition by inputting the measured reception power to the artificial neural network for determining the transmission condition.

4. The electronic device of claim 1, wherein the transmission condition comprises at least one of no transmission beam, NLOS (non-line of sight), or LOS (line of sight), and
    wherein the processor is configured to predict a reception beam using an artificial neural network corresponding to the transmission condition.

5. The electronic device of claim 4, wherein the processor is configured
    if the transmission condition is "NLOS", to predict a reception beam using an artificial neural network corresponding to "NLOS", and
    if the transmission condition is "LOS", to predict a reception beam using an artificial neural network corresponding to "LOS".

6. The electronic device of claim 4, wherein the processor is configured, if the transmission condition is "no transmission beam", to perform a reception beam prediction process for a reception beam that is not selected from among the plurality of reception beams.

7. The method of claim 1, wherein the processor is configured
    if reception power of the selected reception beam is less than or equal to a minimum power, to determine the transmission condition to be "no transmission beam", and,
    if the reception power of the selected reception beam exceeds the minimum power, to determine the transmission condition to be "NLOS" or "LOS".

8. The electronic device of claim 7, wherein the processor is configured
- if a difference in reception power between the selected reception beams is less than or equal to a reference value, to determine the transmission condition to be "NLOS", and
- if a difference in reception power between the selected reception beams exceeds the reference value, to determine the transmission condition to be "LOS".

9. The electronic device of claim 1, wherein the processor is configured to
- predict a reception beam using the artificial neural network corresponding to the transmission condition,
- determine success or failure of communication through the predicted reception beam, and
- determine a reception beam for a communication connection, based on the determination result.

10. The electronic device of claim 9, wherein the processor is configured
- to predict an error rate of the predicted reception beam, and
- if the predicted error rate is less than a threshold, to determine the predicted reception beam to be a reception beam for a communication connection.

11. The electronic device of claim 9, wherein the processor is configured
- to predict an error rate of the predicted reception beam,
- if the predicted error rate is greater than or equal to a threshold, to determine that communication fails, and
- to perform a reception beam prediction process for a reception beam that is not selected from among the plurality of reception beams.

12. The electronic device of claim 1, wherein the processor is configured to
- predict a reception beam using an artificial neural network corresponding to the transmission condition,
- measure reception power of the predicted reception beam, and
- determine a reception beam for a communication connection, based on the measured reception power.

13. The electronic device of claim 12, wherein the processor is configured
- if the reception power of the predicted reception beam is greater than or equal to a reference value, to predict an error rate of the predicted reception beam, and
- if the predicted error rate is less than a threshold, to determine the predicted reception beam to be a reception beam for a communication connection.

14. The electronic device of claim 12, wherein the processor is configured
- if the reception power of the predicted reception beam is less than a reference value, to predict an error rate of a reception beam having the highest reception power among the reception beams whose reception power was measured, and
- if the predicted error rate is less than a threshold, to determine the reception beam having the highest reception power to be a reception beam for a communication connection.

15. An operation method of an electronic device, the method comprising:
- selecting some reception beams from among a plurality of reception beams in different directions from each other;
- measuring reception power of the selected reception beams;
- determining a transmission condition through an artificial neural network, based on the measured reception power; and
- determining a reception beam for a communication connection using an artificial neural network corresponding to the transmission condition.

* * * * *